(12) United States Patent
Rothschild et al.

(10) Patent No.: US 12,243,420 B1
(45) Date of Patent: Mar. 4, 2025

(54) GEOGRAPHICALLY-CONVERGED TELEMETRY SYSTEM

(71) Applicant: Cox Communications, Inc., Atlanta, GA (US)

(72) Inventors: Keith Alan Rothschild, Dunwoody, GA (US); Dipan Patel, Atlanta, GA (US); Ron Lev, Atlanta, GA (US); Steve Malenfant, Cumming, GA (US)

(73) Assignee: COX COMMUNICATIONS, INC.

( * ) Notice: Subject to any disclaimer, the term of this patent is extended or adjusted under 35 U.S.C. 154(b) by 1016 days.

(21) Appl. No.: 16/738,603

(22) Filed: Jan. 9, 2020

(51) Int. Cl.
| | |
|---|---|
| *G08G 1/08* | (2006.01) |
| *G08G 1/00* | (2006.01) |
| *G08G 1/01* | (2006.01) |
| *G08G 1/081* | (2006.01) |
| *G08G 1/09* | (2006.01) |
| *G08G 1/0967* | (2006.01) |
| *G05D 1/00* | (2006.01) |

(52) U.S. Cl.
CPC .......... *G08G 1/081* (2013.01); *G08G 1/0112* (2013.01); *G08G 1/0129* (2013.01); *G08G 1/0141* (2013.01); *G08G 1/096708* (2013.01); *G08G 1/096775* (2013.01); *G05D 1/0088* (2013.01)

(58) Field of Classification Search
CPC .... G08G 1/081; G08G 1/0112; G08G 1/0129; G08G 1/0141; G08G 1/096708; G08G 1/096775; G05D 1/0088; G05D 2201/0213

See application file for complete search history.

(56) References Cited

U.S. PATENT DOCUMENTS

| | | | | |
|---|---|---|---|---|
| 2016/0349073 | A1* | 12/2016 | Geelen | G01C 21/3685 |
| 2016/0379490 | A1* | 12/2016 | Simanowski | G08G 1/015 340/910 |
| 2017/0123419 | A1* | 5/2017 | Levinson | G01S 7/4972 |
| 2018/0293809 | A1* | 10/2018 | James | H04W 4/38 |
| 2019/0266484 | A1* | 8/2019 | Maluf | G06N 3/08 |
| 2019/0320328 | A1* | 10/2019 | Magzimof | H04W 4/40 |
| 2020/0007460 | A1* | 1/2020 | Guim Bernat | G06F 9/5077 |
| 2020/0074853 | A1* | 3/2020 | Miller | H04W 4/02 |
| 2020/0133288 | A1* | 4/2020 | Abari | G05D 1/0088 |

* cited by examiner

*Primary Examiner* — Tyler J Lee
(74) *Attorney, Agent, or Firm* — Merchant & Gould P.C.

(57) ABSTRACT

A geo-converged telemetry (GCT) system is described that provides an exchange of geographically-relevant telemetry data amongst various vehicles, devices, and systems for providing a holistic view of a geographic area. Telemetry data from various sources may be continually collected and transmitted to a nearby node of a GCT system, where the data may be converged based on geolocation and processed. The same and/or other vehicles, devices, and systems may operate as telemetry consumers that receive feeds of geo-converged telemetry data that may be tailored to functionalities of the consumer. As a vehicle moves, data that are determined to be geographically-relevant changes. The location of the processing may move from one processing node to another processing node in the edge network such that the processing is located proximate to the vehicle to minimize latency and provide real time or near-real time feedback based on a holistic view of the geographic area.

20 Claims, 16 Drawing Sheets

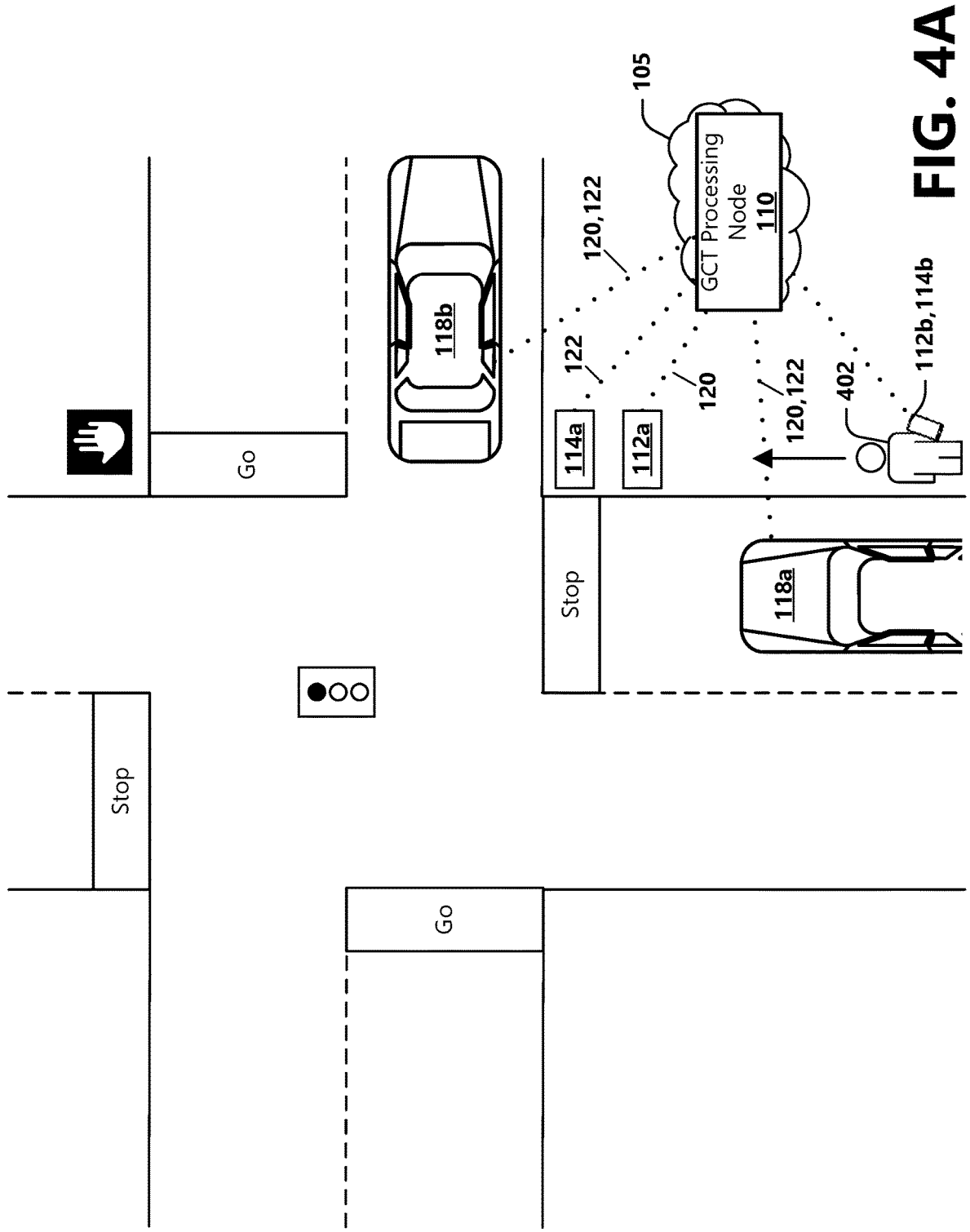

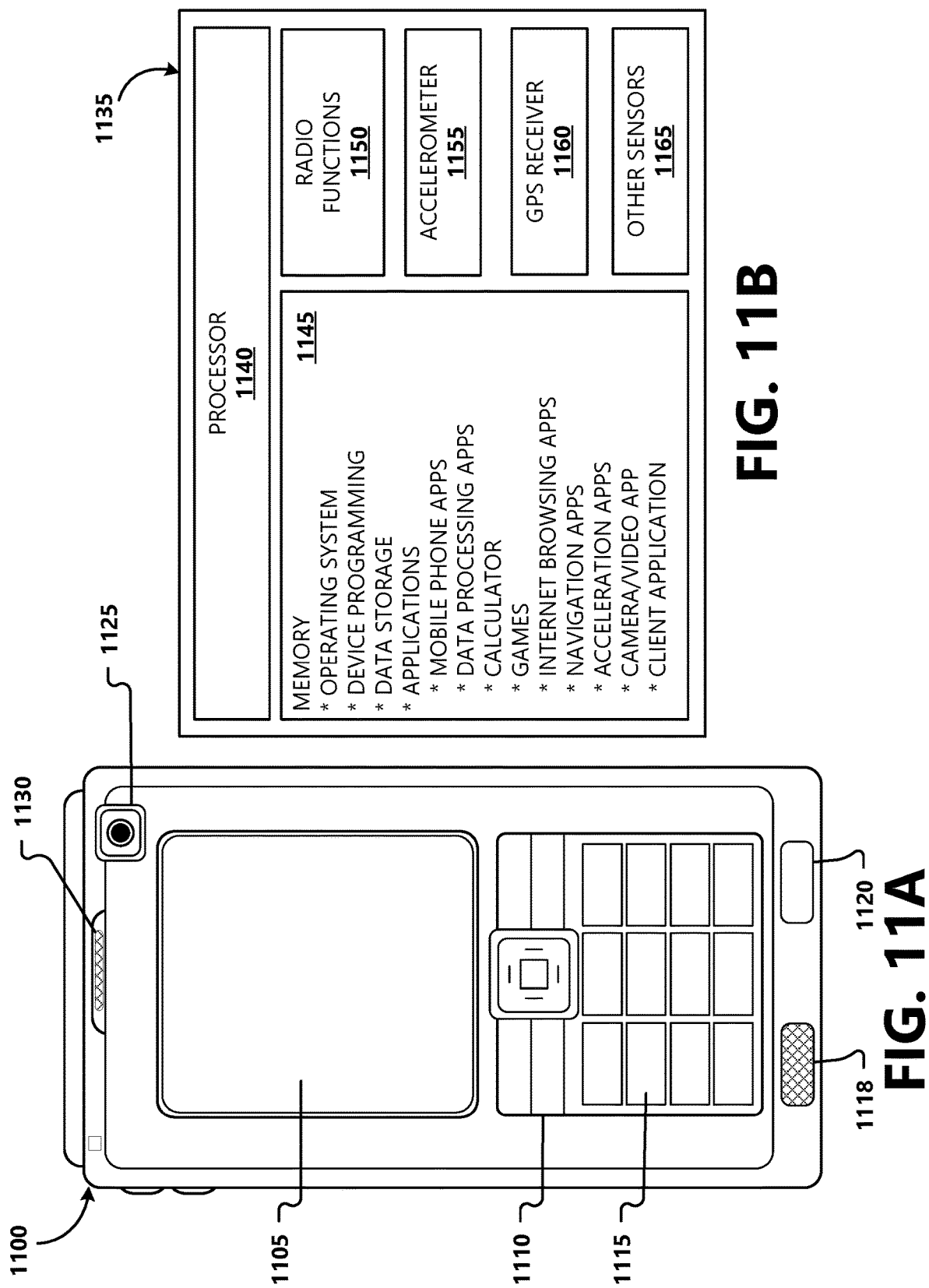

GEOGRAPHICALLY-CONVERGED TELEMETRY SYSTEM

BACKGROUND

Various types of automated systems comprise various sensors that collect telemetry data used to make or influence decisions. For example, a smart vehicle can use sensors to scan the road and surrounding vehicles to make decisions related to speed, braking, steering, etc. However, such smart vehicles may be limited to data collected from the immediate area of the vehicle, and may not have access to other data that can inform the vehicle about what is ahead or what a surrounding vehicle may do next. Accordingly, the smart vehicle's ability to make informed decisions may be not be optimized. For example, the information that the vehicle uses to make automated decisions may be constrained to a dataset gathered from the limited local area. This limited dataset may not provide the vehicle with information that could allow it to make decisions that can improve safety, efficiency, routing, etc. Additionally, the data collected by the smart vehicle may not be shared with other vehicles, traffic control systems, or pedestrians in the area that could use the data to make informed decisions.

SUMMARY

Aspects of the present disclosure provide a system, method, and computer readable storage device for providing geographically-converged locally-relevant telemetry data. According to an aspect, a geo-converged telemetry system is configured to collect telemetry data from a plurality of telemetry sources, including telemetry sources that are transient. For example, telemetry from various vehicles (e.g., automobiles, motorized scooters, motorized bikes, mobile robots), from various traffic control systems, and from other devices and systems may be continually fed to one or more processing nodes of the geo-converged telemetry system, where the geo-converged telemetry system may be configured to determine a geolocation of the telemetry, associate the geolocation with the data, and analyze and process the collected telemetry, for example, for one or a combination of: correlating local data points, making predictions, transforming data, filtering data, converging data, and determining which data are relevant to particular telemetry consumers (which may include the various transient telemetry sources) based at least in part on the geolocation associated with the data. As can be appreciated, as a vehicle moves and its location is continually updated, the data that are determined to be relevant to it will change. Relevancy can additionally be based on the type of telemetry data and the type of telemetry consumer (e.g., decisions made by the consumer) receiving the data.

In some examples, the geo-converged telemetry data may be published to one or more queues based on a set of criteria, wherein a telemetry consumer may be configured to receive data published to the one or more queues. In other examples, the telemetry consumer may query the geo-converged telemetry system for telemetry that are locally-relevant to the consumer. As can be appreciated, by collecting and providing telemetry data from various sources, the telemetry consumers may be provided with an increased amount of relevant data that enables the consumers to make decisions off an extended and more comprehensive representation of the environment in which the consumers are operating. For example, the criteria that a telemetry consumer bases decisions on may be related to attributes of the consumer's operating environment. Accordingly, this extended and more comprehensive view of the consumer's operating environment can improve the decision-making functionalities of the consumer for operating more efficiently and with improved performance. For example, telemetry data collected from various other telemetry sources may provide the consumer with information produced by sensors to which the consumer may not have access and/or may provide the consumer with information about certain conditions in a wider area. The consumer may be enabled to detect and respond to events that the consumer may otherwise not be able to detect based on its own telemetry data.

As can be appreciated, in traffic situations, vehicles or other telemetry consumers may need to react in real time or near-real time to external factors, such as changing road/traffic conditions. Accordingly, as a vehicle travels along a route, the vehicle's telemetry data may be fed to and/or transferred between various geo-converged telemetry system processing nodes for enabling the telemetry data and processing of the data to follow the vehicle as it moves between nodes. For example, the location of the processing may move from one processing node to another processing node in the edge network such that the processing is located proximate to the vehicle to minimize latency and provide real time or near-real time feedback based on a holistic view of the geographic area.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 4A and 4B are illustrations of another example implementation of the geo-converged telemetry system in an edge network;

FIGS. 11A and 11B are block diagrams illustrating example physical components of a suitable mobile computing environment with which aspects of the present disclosure can be practiced.

DETAILED DESCRIPTION

Figure 1A:
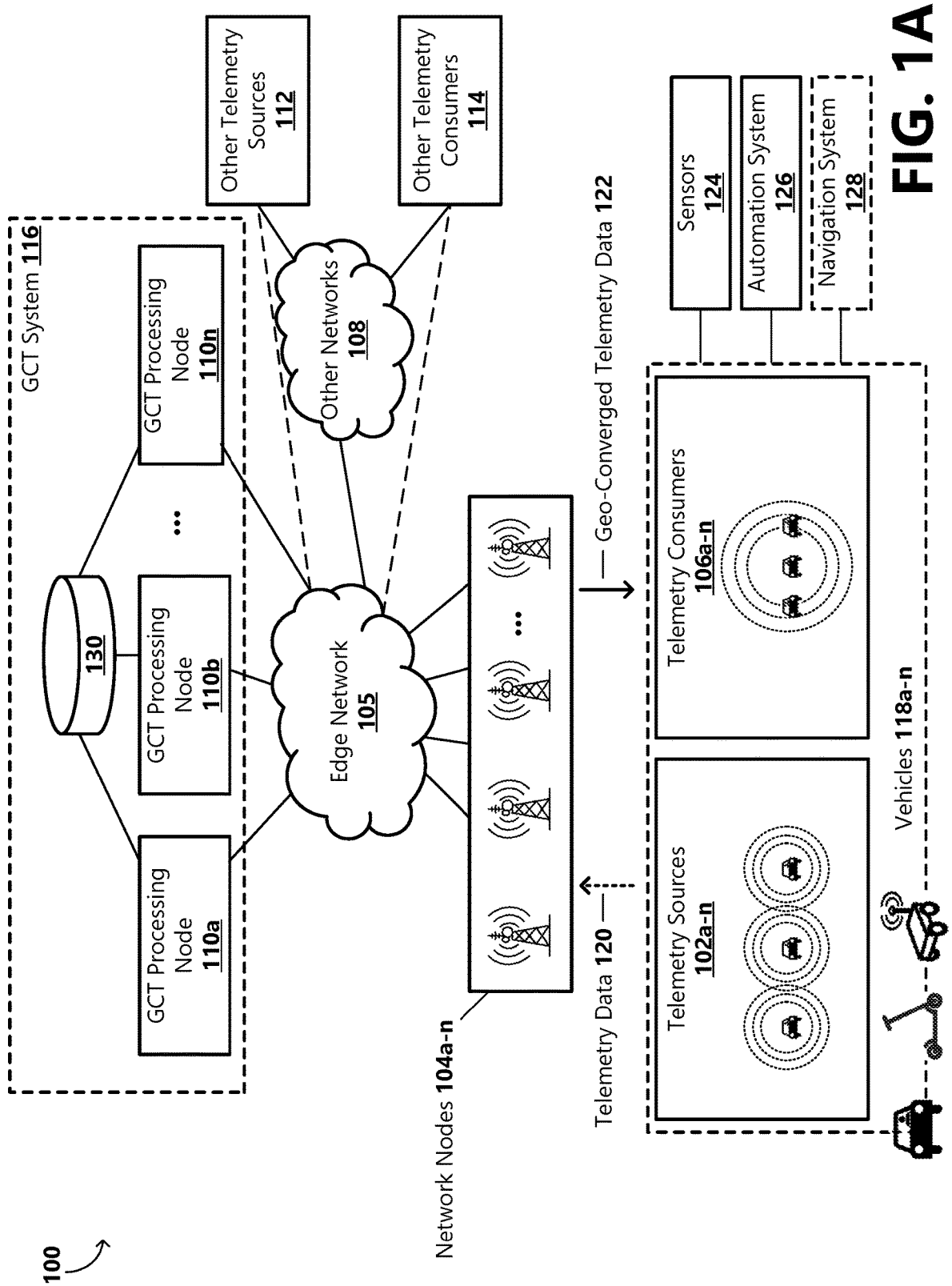
FIG. 1A is a block diagram depicting an example operating environment in which aspects of a geo-converged telemetry system may be implemented.

Aspects of the present disclosure provide a geo-converged telemetry (GCT) system that provides an exchange of geographically-relevant telemetry data amongst various vehicles, devices, and systems for providing a holistic view of a geographic area. As should be appreciated, the term "vehicle" is used herein to describe various types of non-stationary devices, such as automobiles, motorized scooters, motorized bikes, mobile robots, etc. Other types of vehicles are possible and are within the scope of the present disclosure. In various aspects, the telemetry data are geotagged, time-stamped, and processed such that local actionable information may be provided to data consumers. The information may enable the data consumers to make transportation-associated decisions that may increase safety, traffic flow, and/or fuel/power economy, optimize individual or holistic traffic routing/management, enable various automated functionalities, enable various paid services, such as reserving resources (individually or collectively) to optimize travel routes (e.g., alter traffic signal phase and timing, swing lane direction, speed limits, flow control, or other resources which impact travel time), etc. According to an aspect, the GCT system is comprised of a plurality of processing nodes distributed throughout an edge network. Vehicles, various devices, sensors, and other systems may serve as telemetry sources that continually feed telemetry data to the GCT system. The same and/or other vehicles, devices, and systems may operate as telemetry consumers that receive feeds of geographically-converged (geo-converged) telemetry data from the GCT system that may be tailored to the consumer's location and functionalities of the consumer. As can be appreciated, as a vehicle moves and its location is continually updated, the data that are determined to be relevant to it will change. The feeds of geo-related telemetry data may be based on processing of various telemetry data provided by a plurality of telemetry sources, and the location of the processing may move from one processing node to another processing node in the edge network such that the processing is located proximate to the vehicle to minimize latency and provide real time or near-real time feedback based on a holistic view of the geographic area.

As an example, a road hazard sensed by a first vehicle may be communicated to the GCT system and shared with other vehicles that are determined to be potentially affected by the road hazard, thus enabling the other vehicles to take an action to avoid the hazard (e.g., change route, brake, accelerate), warn the driver of the vehicle of the hazard, or take another action.

As another example, telemetry data, which may include navigation data, may be provided by various vehicles to the system, which may process the telemetry for determining a particular timing of a traffic control signal to optimize traffic throughput, and provide the determined optimized timing to the traffic control signal system. In some implementations, a driver of a vehicle may pay for a service that may alter traffic light timing of one or more traffic lights along a route for optimizing the vehicle's travel time along the route.

As another example, telemetry data including navigation data may be collected from various vehicles, converged based on geographic-relevance, and shared amongst the various vehicles for enabling the vehicles to take actions to optimize traffic flow based on an awareness of nearby vehicles' anticipated navigation actions.

As another example, a parking garage may provide telemetry data to the GCT system that include information about a number of currently available parking spaces, and various vehicles may provide telemetry data to the system that include navigation data indicating a destination of the parking garage. Based on the received telemetry data, the system may be able to predict whether a parking space may be available for the various vehicles, and may communicate the prediction to the various vehicles. A vehicle that may receive a prediction that a parking space may not be available may make a decision to reroute to another parking garage. Or, based on received data, a vehicle may be enabled to reserve an available parking space.

With reference now to FIG. 1, a block diagram of an example operating environment 100 is shown in which a GCT system 116 may operate for providing a localized traffic telemetry data exchange in which various telemetry data 120 are collected and processed, and in which relevant actionable data are determined and provided to telemetry consumers 106a-n, 114 based on a holistic view of a geographic area. According to an aspect, the GCT system 116 may be implemented in an edge network 105, wherein an edge network may describe a network located on the periphery of a centralized network, such as the Internet. For example, an edge network 105 may be provided by a network service provider (NSP), and may connect users to a centralized network or other networks 108. An edge network 105 may comprise various network nodes 104a-n that serve as connection points that can receive, create, store, or send data along distributed network routes. For example, a network node 104 may include various electronic, optical, or wireless technology network components that may recognize, process, and forward transmissions of data to other network nodes. Examples of network nodes 104 include, but are not limited to, regional level routers, edge routers, data centers, cell towers, access points, repeaters, optical nodes, hubs, base stations, base station controllers, etc.

According to an aspect, the edge network 105 may serve to connect telemetry sources 102a-n (collectively 102), 112 and telemetry consumers 106a-n (collectively 106),114 to one or more GCT processing nodes 110a-n (generally 110) of the GCT system 116. A GCT processing node 110 may be deployed at a network node 104 or on another physical or virtual resource (e.g., a physical server computing device or a virtual server) in the edge network 105. A GCT processing node 110 is illustrative of a software application, module, or computing device operable or configured to receive telemetry data 120 from a plurality of telemetry sources 102,112 to process the telemetry data and to provide geo-converged telemetry data 122 to telemetry consumers 106,114, wherein the geo-converged telemetry data may be determined based at least in part on geolocation and time metadata associated with the received telemetry data 120 and a current or projected geolocation of the telemetry consumers 106,114. For example, the geo-converged telemetry data 122 may include relevant actionable information that enables a telemetry consumer 106,114 to make a decision and/or perform an action based on a holistic view of a geographic area. In example aspects, geo-converged telemetry data 122 may include predictions made by the GCT system 116.

According to an aspect, a telemetry source 102 may be embodied as a vehicle 118 or other telemetry source 112. In example aspects, a vehicle 118a-n (generally 118) is illustrative of a source and a consumer of telemetry data that is not at a fixed position. That is, a vehicle 118 may operate as both a telemetry source 102 and a telemetry consumer 106. An example of a vehicle 118 is an automobile whose geographic location may change over time and that is configured to transmit telemetry data 120 to and to receive geo-converged telemetry data 122 from the GCT system 116. For example, a vehicle 118 may provide telemetry data 120 about the state of its surroundings, such as the presence/positions/states of other vehicles, pedestrians, animals, children, objects, road hazards, road conditions, weather conditions, road signs, etc. Vehicles 118 may include autonomous vehicles (e.g., fully-automated vehicles), partially or conditionally automated vehicles, vehicles with driver assistance functionalities, or vehicles without automation. Other vehicles 118 may include electric/motorized scooters, electric/motorized bikes, other means of transportation, mobile security robots, and the like. In some examples, a mobile computing device, such as a mobile phone, may be communicatively attached and may operate in association with a vehicle 118.

As can be appreciated, the transmission and processing of telemetry data 120, and the transmission of geo-converged telemetry data 122 may be time-sensitive. Accordingly, the location of processing of particular telemetry data 120 may be determined based on a vehicle's 118 location and/or anticipated location. For example, the anticipated location of a vehicle 118 may be determined based on navigation data included in telemetry data 120 that may be provided by the vehicle. Navigation data may include data that may be used to determine a trajectory, path, or position of a vehicle 118 at a given time or over an interval of time. Navigation data may include an intended destination of a vehicle 118, which may be input or inferred based on historical data. As the vehicle 118 travels along its planned or anticipated route, telemetry data 120 may be continually collected and transmitted to various GCT processing nodes 110a-n along the route. According to an example aspect, telemetry data 120 may be directed to a particular GCT processing node 110a, and the processing of the vehicle's telemetry data 120 may be passed from the particular GCT processing node 110a to a next GCT processing node 110b-n in the edge network 105 based on the vehicle's anticipated location(s). Accordingly, the vehicle 118 may be enabled to be connectively attached to the GCT system 116 via various GCT processing nodes 110a-n, wherein the particular GCT processing node that the vehicle 118 is in contact with at a given time may be one determined to provide minimal latency in data transmissions between the vehicle and the particular GCT processing node based on the vehicle's projected locations at given times or intervals of time. In some example aspects, mesh networking technologies may be utilized for enabling vehicle-to-vehicle communications. For example, a first vehicle 118 may be communicatively connected to a network node 104. Other vehicles may link to the first vehicle and piggyback off the first vehicle's connection to the network node 104 to transmit telemetry data 120 to the first vehicle and via the first vehicle to a GCT processing node 110 rather than each vehicle connecting to a network node 104 individually.

Other telemetry sources 112 may include systems, services, or other stationary sources of telemetry data, such as traffic control/monitoring systems, parking automation/guidance systems, parking meters, weather services, social media systems, or other systems that are configured to provide telemetry data 120 associated with a particular area or system. According to one example, a query may be made to a social media system for information about upcoming events associated with a particular geographic area. For example, an event such as a sporting event or a concert may affect traffic flow. Based on telemetry data 120 included in a received response, the GCT system 116 may be able to predict an increase in traffic volume at a particular location at a particular time or time range.

According to another example, a traffic control/monitoring system may provide telemetry data about the state (e.g., vehicle traffic, pedestrian traffic, weather conditions) of an intersection or a section of roadway; a parking automation/guidance system may provide telemetry data about the state (e.g., availability of parking spaces) of a parking lot/facility; a parking meter may provide telemetry data about whether a parking space is occupied/available and/or an amount of time remaining for an occupied parking space; and a weather service may provide telemetry data about weather conditions of a geographic area. Other types of other telemetry sources 112 are possible and are within the scope of the present disclosure. In some examples, another telemetry source 112 may be configured to provide telemetry data 120 to a particular GCT processing node 110 based on the other telemetry source's geolocation. In other examples, the other telemetry source 112 may be configured to provide telemetry data 120 to a particular GCT processing node 110 based on the location of a particular telemetry consumer 106,114.

Vehicles 118 configured as telemetry sources 102 and other telemetry sources 112 may comprise one or more sensors 124 configured to sense, measure, and/or record information about their surroundings. For example, a telemetry source 102,112 may comprise sensors 124 and/or localization systems, such as such as cameras, light detection and ranging (LiDAR) units, radio detection and ranging (RADAR) units, ultrasound sensors, global positioning system (GPS) units, accelerometers, etc., that collect telemetry data 120 from the source and the source's surroundings and transmit the collected telemetry data to a GCT processing node 110 via a network node 104. As a vehicle 118 travels, it may connect with different network nodes 104 and with various GCT processing nodes 110. Telemetry sources 102, 112 may connect to a GCT processing node 110 via a network node 104 in the edge network 105, or may connect to a GCT processing node 110 via another network 108. A plurality of telemetry sources 102,112 may provide telemetry data 120 about their surroundings such that the GCT system 116 is enabled to determine, from the collected telemetry data, a holistic view of a geographic area.

As used herein, telemetry data 120 (sometimes referred to herein as telemetry) include environmental, device, and/or navigation data that are recorded by various telemetry source sensors 124 and that are transmitted to one or more GCT processing nodes 110 for analysis, processing, and convergence with other telemetry data. In some example aspects, navigation data may be provided by a navigation system 128 incorporated in or communicatively attached to a vehicle 118. For example, a vehicle 118, such as a vehicle, may include a built-in navigation system 128; or, the vehicle 118 may be communicatively attached to a mobile communication device or other device running a navigation application. Navigation data may include data that can be used to determine the position and orientation of a vehicle 118 or a sensed object at a given time (e.g., present and imminent future) or over an interval of time.

In some examples, a telemetry source 102,112 may be registered with the GCT system 116 for publishing telemetry data 120 generated by one or more sensors 124 to a GCT processing node 110. In some examples, as part of registering a telemetry source 102,112 to push telemetry to the GCT system 116, the telemetry source may be configured to communicate with the telemetry convergence system via an application programming interface (API) provided by the telemetry convergence system. For example, the telemetry source 102,112 may use the API to publish telemetry data to the GCT system 116. According to an example aspect, telemetry provided by telemetry sources 102,112 may be in a variety of formats and use various communication protocols (e.g., HTTPS (Hypertext Transfer Protocol Secure), MQTT (Message Queuing Telemetry Transport), CoAP (Constrained Application Protocol), LoRaWAN® (Low Power Wide Area (LPWA) networking)). According to an aspect, transmissions of telemetry data 120 from a telemetry source 112 may be made via wired and/or wireless means. In some examples, telemetry provided by a telemetry source 102,112 may include unencrypted data that may be published for free use. In other examples, telemetry provided by a telemetry source 102, 112 may include encrypted private data that an owner of the source consents to share with the GCT system 116 (e.g., directly or via a third-party platform). Telemetry data 120 transmitted to the GCT system 116 may be in the form of a message or data file that may include addressing information, a timestamp, and encrypted or unencrypted telemetry data. A telemetry data packet may further include various attributes, such as but not limited to, an identifier of the telemetry source 102,112, an identifier of the sensor(s) 124, an identifier of the telemetry data type, etc.

As will be described in further detail below, the GCT system 116 may be configured to receive telemetry data 120 provided by various telemetry sources 102,112, determine a geolocation of the telemetry data, associate geolocation metadata with the telemetry, and store geotagged telemetry data in one or more data lakes 130. For example, a data lake 130 is illustrative of a data store configured to store structured, unstructured, and/or hybrid data. In example aspects, the data lake 130 may store received telemetry data 120 data in its native format, wherein geolocation metadata may be associated with the telemetry data. Telemetry data 120 in the data lake 130 may be stored such that it can be accessed by other GCT system 116 components that may analyze the data for correlating telemetry with other local data points, converge telemetry based at least in part on the geolocation metadata, make predictions based on the telemetry, and provide the geo-converged telemetry data 122 (which may include predictions) to telemetry consumers 106, such as vehicles 118, and/or other telemetry consumers 114 (e.g., traffic control systems, parking systems, or other systems). For example, a telemetry consumer 106,114 may use the geo-converged telemetry data 122 to warn/notify individuals or as input data for automatically controlling processes or operations of various automation systems 126 or other systems. For example, a vehicle 118 may comprise various automation systems 126 of various automation levels that may use telemetry data 120 and geo-converged telemetry data 122 to activate a driver assistance feature (e.g., provide visual, audio, and/or tactile notifications to a driver of the vehicle) or an automated driving function (e.g., acceleration, braking, steering). As another example, a traffic control system may control a traffic signal, pedestrian crossing signal, warning signal, etc., based on received geo-converged telemetry data 122 and/or predictions provided by the GCT system 116. As another example, a parking system or parking meter may be enabled to reserve a parking space for a particular vehicle 118 based on received geo-converged telemetry data 122 and/or predictions provided by the GCT system 116. Other examples are possible and are within the scope of the present disclosure. As can be appreciated, when telemetry data 120 from various sources are converged and processed, the data provided to telemetry consumers 106, 114 can provide the consumer with an extended and more comprehensive representation of the environment in which the consumer is operating. For example, the criteria that a vehicle 118 or other telemetry consumer 114 bases decisions on may be based on what is sensed in the vehicle's/consumer's surroundings. Accordingly, by converging telemetry data 120 based on geolocation, the geo-converged telemetry data 122 may provide an extended view of the vehicle's/consumer's surroundings, which can improve the decision-making functionalities of the vehicle/consumer and/or predictions made based on the geo-converged telemetry data.

Figure 1B:
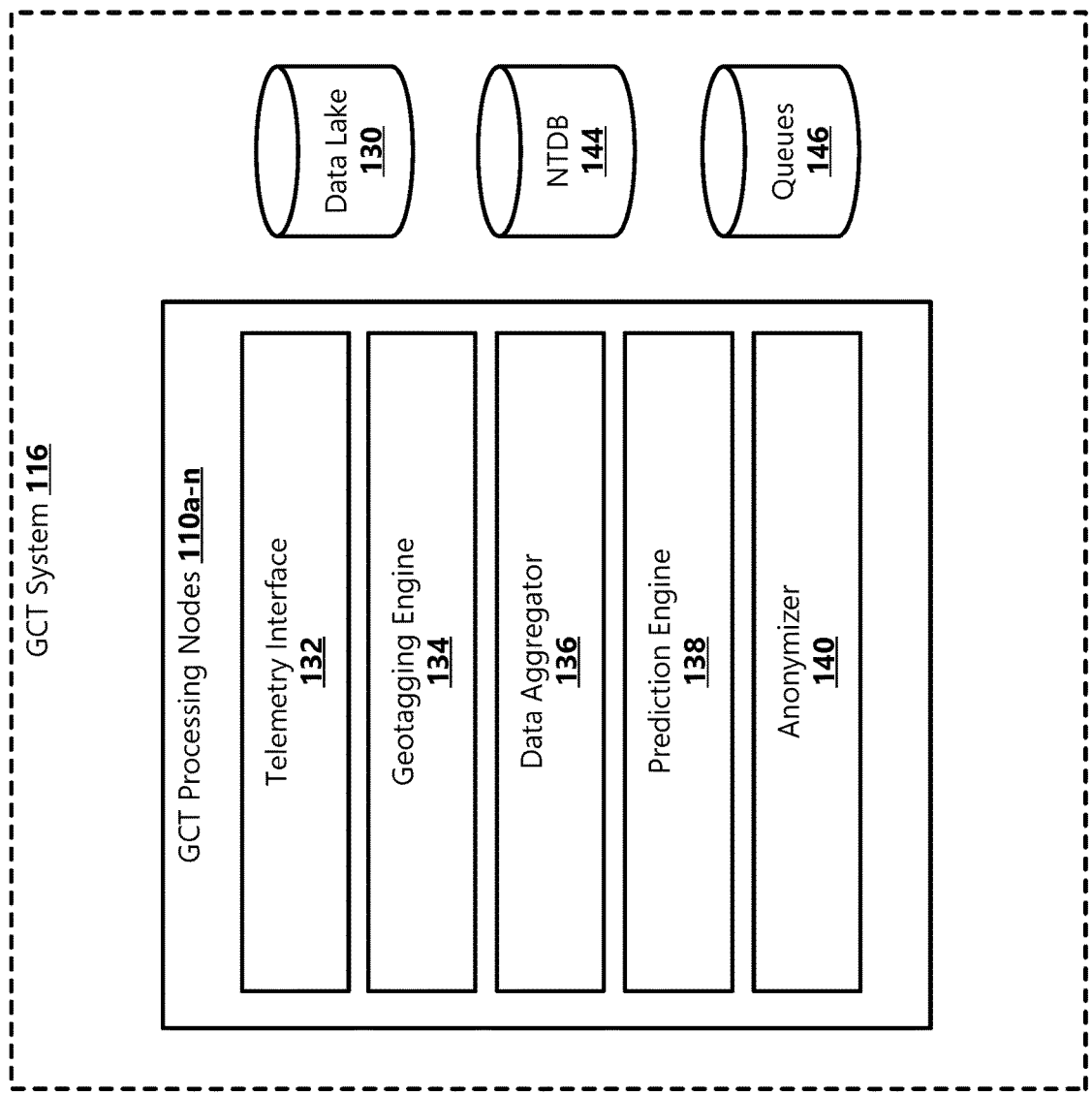
FIG. 1B is a block diagram depicting example components of the geo-converged telemetry system.

With reference now to FIG. 1B, various components of an example GCT processing node 110 of the GCT system 116 are illustrated. As should be appreciated, a GCT processing node 110 may include more or less components, and various components may be combined. The telemetry interface 132 is illustrative of a software application, module, or computing device operable or configured to receive telemetry data 120 supplied by a plurality of vehicles 118 and other telemetry sources 112, and to provide relevant geo-converged telemetry data 122 that are geotagged with geolocation metadata to vehicle 118 and other telemetry consumers 114. In some examples, a telemetry source 112 may be configured to share telemetry data 120 with a GCT processing node 110 via registering the telemetry source as a content provider to the GCT system 116. As part of registering a telemetry source 112, information about the source (e.g., sensor 124 type, source identifier) may be provided to GCT system 116. Additionally, an owner of the telemetry source 112 may consent to share the telemetry data 120, and in some examples, consent to share location information and/or other information associated with the telemetry data/source.

Vehicles 118 and other telemetry sources 112 may be configured to provide telemetry data 120 to a GCT processing node 110, and the telemetry interface 132 may be configured to receive telemetry data from telemetry sources via various types of interfaces and protocols (e.g., an API, a standards-based protocol (e.g., SNMP), a proprietary protocol (e.g., bit-mapped or REST-(REpresentational State Transfer) based interaction, via a message bus, queuing service, a pub-sub service, in a single field, in a JSON payload, etc. In some examples, telemetry data 120 transmitted to a GCT processing node 110 may include a timestamp. In other examples, the network node 104 or the telemetry interface 132 may assign a timestamp to telemetry data 120 when the data are received.

In example aspects, telemetry data 120 may be pushed by a vehicle 118 or another telemetry source 112 to a GCT processing node 110. For example, a vehicle 118 or another telemetry source 112 may transmit telemetry data 120 to a GCT processing node 110 continually, when the data are sensed or collected (e.g., in real time or near-real time), or based on an event threshold. As described above, the telemetry data 120 may be communicated to a GCT processing node 110 via a network node 104 via which the vehicle 118 or another telemetry source 112 is connected. Depending on how a telemetry source 112 is configured, telemetry data 120 may be collected by the telemetry source 112 periodically or responsive to a triggering event (e.g., when motion is sensed, when an object is detected). In other examples, telemetry data 120 may be pulled from a vehicle 118 or another telemetry source 112. For example, the telemetry interface 132 may request telemetry data 120 from a vehicle 118 or another telemetry source 112, and the vehicle of other telemetry source may transmit the requested data to the telemetry data collector as a response. The request may be a periodic request, or the telemetry interface 132 may request telemetry data from one or more vehicles 118 or other telemetry sources 112 in response to a request for telemetry data associated with the location of the vehicle/source from another vehicle 118 or other telemetry consumer 114. For example, when a vehicle 118 or other telemetry consumer 114 makes a decision, the vehicle/consumer may be configured to request geo-converged telemetry data 122 from the GCT system 116. In an example aspect, a vehicle 118 or other telemetry consumer 114 may request to receive geo-converged telemetry data 122 that are geotagged with geolocation metadata that are relevant to the vehicle/consumer. According to an example aspect, the telemetry interface 132 may be configured to pass received telemetry data 120 to the geotagging engine 134 for determining a geolocation of the telemetry and associating geolocation metadata with the data.

The geotagging engine 134 is illustrative of a software application, module, or computing device operable or configured to determine where received telemetry are originated, and to apply geolocation metadata (sometimes referred to as geolocation tags or geotags) to the telemetry data. According to an example aspect, the geolocation metadata identify a geolocation corresponding to the source of the telemetry data. The geolocation metadata can be used by the system for determining whether the associated telemetry data 120 are geographically relevant to a particular vehicle 118 or other telemetry consumer 114. The geolocation metadata may include latitude and longitude coordinates of a location of the telemetry source 102,112, a location of a potential hazard sensed by the telemetry source, or an identifier associated with a generalized location of the telemetry source (e.g., a particular intersection, network node 110). In some examples, such as when a telemetry source 112 is static, the telemetry source may have a known geo-location associated with it. In other examples, the telemetry source 102,112 may provide a geo-location. The geo-location may be provided with the telemetry data 120 that is sent to the GCT system 116, or may be correlated by the geotagging engine 134 based on an identifier associated with the telemetry source 102,112 and a time-date stamp, and a later geolocation of the source can be tied to telemetry data 120 sent from that source at that time.

In some examples, geolocation-tagging of telemetry data 120 assigns a geotag to a received telemetry data packet based on a known physical location of the network node 104 through which the telemetry source 102,112 transmitting the telemetry is communicatively connected. For example, GCT system 116 may be implemented by a network service provider (NSP), and the geotagging engine 132 may be configured to inspect telemetry data packets that are sent from the telemetry source 102, 112 through the NSP network (e.g., edge network 105). In some examples, inspection of telemetry data packets may include a shallow packet inspection that identifies network addressing information included in the data packet. For example, the network addressing information may be included in a header portion of a telemetry data packet, and may identify source and destination nodes made by the telemetry data packet as the data are transferred from the telemetry source 102,112 on the NSP network.

According to an aspect, the geotagging engine 132 may be configured to access a network topology database 144 that may be included in or communicatively connected to the GCT system, wherein the network topology database 144 may be configured to store physical network topology information, such as information about the physical connections in the NSP (edge) network 105 and how end devices and infrastructure devices/network nodes 104 (e.g., routers, switches, wireless access points) are interconnected. Information about network nodes 104 stored in the network topology database 144 may include network node addressing information and geolocations (e.g., latitude and longitude) of the network nodes. The geotagging engine 210 may query the network topology database 144 for determining the geolocation of a network node 104 identified as a source node in the telemetry data 120 packet.

In various examples, advertised geolocations of the network nodes 104 may be incorrect. As an example, a link (network node 104) may be published as being in one location and owned by a particular telecommunications company associated with that location; however, it may be observed that it may take less time than expected for a data transmission to go through that hop on shorter known path. Therefore, it may be determined that the node 104 cannot be in the published location, and is likely passing through a gateway associated with (e.g., possibly owned and operated by) that telecommunications company. Accordingly, in another example aspect, such as in a wireless communication scenario, the geotagging engine 134 may be configured to determine the geolocation of a vehicle 118 using GPS triangulation, cell tower triangulation, WI-FI positioning, and/or other known pinpointing methods. For example, the geolocation of a vehicle 118 may be determined based on known geolocations of network nodes 104 (e.g., cell towers, wireless access points) and signal strength data and/or ping data provided by the node. For example, a vehicle 118 may communicate wirelessly via a cellular network. The telemetry source's communication signal may be picked up by a plurality of network nodes 104. Based on known geolocations of the network nodes 104 that receive the source's signal, the distance of the vehicle 118 from each network node 104 can be estimated based on lag time between when the node sends a ping to the vehicle and receives an answering ping back and/or based on the vehicle's signal strength. As another example, a vehicle 118 may be configured to seek WI-FI access points. By identifying the WI-FI access points that the vehicle 118 is within range of and the strength of the WI-FI signals that the vehicle is receiving, and based on knowledge of the geolocations of the WI-FI access points (e.g., stored in the network topology database 144 or accessing the geolocations of the WI-FI access points via an API interfacing a third-party system), a determination may be made as to the vehicle's geolocation. In another example aspect, the geolocation of telemetry may be provided by the telemetry source 102,112. For example, location information may be manually or automatically assigned to the telemetry source 102,112, or may be determined and provided by a GPS or other location determining system included in or coupled with the telemetry source.

The geotagging engine 134 may be further configured to attach the determined geolocation to the telemetry data 120 as metadata. For example, the geotagging engine 134 may attach a geotag or geolocation tag to a telemetry data 120 packet. The geotagging engine 134 may be further configured to store geotagged telemetry in a data lake 130 where the data may be accessed by other components of the telemetry convergence system GCT system 116. In various implementations, the data lake 130 may be configured to may store structured, unstructured, and/or hybrid data. For example, a data lake 130 may store received telemetry data 120 in its native format, wherein the telemetry data may be accessed by other components for analysis and processing. In some example aspects, the geotagging engine 134 may transmit geotagged telemetry data 120 to a data aggregator 136, wherein the data aggregator may be located at the same GCT processing node 110 or may be located at another GCT processing node 110. According to an aspect, data may be exchanged between GCT nodes 110 such that processing of certain telemetry data 120 may move with an associated vehicle 118. For example, data and processing may be exchanged between GCT nodes 110 in anticipation of where a vehicle 118 may be located at a particular time according to determined trip routing or a planned navigation route to minimize the distance between the vehicle and the processing of its telemetry data and other geographically-relevant data for minimizing latency of data transmissions.

The data aggregator 136 is illustrative of a software application, module, or computing device operable or configured to correlate and converge telemetry based on various data attributes, make predictions based on historical and/or training data, anonymize the data, and store the processed data in one or more queues 146. According to an aspect, relevance of telemetry data may be based on geographic location, time, and on telemetry data type and a decision needed to be made by particular telemetry consumers 106, 114.

According to one embodiment, a telemetry consumer 106,114 may be configured to pull relevant geo-converged telemetry data 122 from the GCT system 116. For example, periodically or as part of making a decision by an automation system 126 to control an automation action or functionality or as part of making a navigation determination by a navigation system 128 for relevant geo-converged telemetry data 122, the associated telemetry consumer 106,114 may transmit a request to the GCT system 116, wherein the request may be transmitted to a particular GCT processing node 110 geographically-proximate to the consumer. The request may be a query for geo-converged telemetry data 122 that meet certain criteria (e.g., geographic location, data type, age). That is, in some examples, for performing a particular automated function (e.g., automated driving feature, driver assist feature, notification feature, navigation feature), a telemetry consumer 106,114 may make decisions based on certain telemetry data 120; and the telemetry consumer may query the GCT system 116 for the certain telemetry data or query a particular queue 146 to which particular geo-converged telemetry data 122 may be published. In an example aspect, the GCT system 116 may expose an API that the telemetry consumers 106.114 may be enabled to use for interfacing the telemetry convergence system 116 for accessing geo-converged telemetry data 122. For example, a request communicated to the telemetry convergence system 150 via the API 250 may transmit a query to a GCT processing node 110 for geo-converged telemetry data 122 that meet certain criteria.

In some examples, in response to a query, the GCT processing node 110 may be configured to request telemetry data 120 from one or more vehicles 118 and/or other telemetry sources 112 proximate to the requesting telemetry consumer 106,114 or proximate to an anticipated location of the consumer based on known and/or advertised geolocations of the vehicles and/or telemetry sources. Accordingly, various telemetry data 120 associated with a geographic area may be transmitted to the GCT processing node 110 in real time or near-real time that can be processed for providing geo-converged telemetry data 122 to the requesting telemetry consumer 106,114. In other examples, in response to a query, the GCT processing node 110 may be configured to access geotagged telemetry stored in the data lake 130 for determining relevant telemetry to transmit to a requesting vehicle 118 and/or other telemetry consumer 114. For example, based on the current or anticipated location of the vehicle 118 and/or other telemetry consumer 114, the data lake 130 may be queried for geo-tagged telemetry data 120 that may be proximate (e.g., within a defined range) to the location of the vehicle/consumer based on the geolocation metadata. The degree of proximity may be configurable. In some implementations, proximity may be defined as locations within a defined area or radius. In some implementations, proximity may be dependent on decisions made by the requesting vehicle 118 and/or other telemetry consumer 114. For example, if a decision that needs to be made is within 10 ms of accuracy and the telemetry data from a telemetry source 102,112 may have 50 ms of jitter, that telemetry data 120 may not be used; however if 100 ms of accuracy is allowable, telemetry data 120 associated with a measurement is within 50 ms of accuracy, then that telemetry data may be used. Based on the decision being made by a requesting vehicle 118 and/or other telemetry consumer 114, telemetry data 120 of a specific type and telemetry within a certain geographic distance from the vehicle's/consumer's current and/or anticipated location may be specified (e.g., as criteria in the query). According to an aspect, as part of requesting telemetry from a telemetry source 102,112 or as part of querying the data lake 130 for relevant telemetry, the GCT processing node 110 may be configured to request or query a certain type of telemetry data (e.g., temperature data, rain data, sensed objects) from telemetry sources 102,112 the data lake 130.

In various example aspects, the data aggregator 136 may be further configured to process received telemetry data 120 according to various data processing operations, which can provide advantages, such as increased data transfer speeds, increased data access speeds, reduced storage requirements, and providing enhanced or modified data to a vehicle 118 or other telemetry consumer 114 that may enhance capabilities of the vehicle/consumer. For example, such advantages can help to improve the operations of the vehicle 118 or another telemetry consumer 114, such as enabling the vehicle/consumer to make decisions based on telemetry that the vehicle may not have had access to previously. Various example data processing operations are described below with reference to FIG. 8.

According to another embodiment, proactively (e.g., periodically or continually as telemetry data 120 are received), the data aggregator 136 may be configured to analyze geo-tagged telemetry stored in the data lake 130, correlate and converge telemetry based on geolocation, and publish the geo-converged telemetry data 122 to one or more data queues 146 to which a vehicle 118 or other telemetry consumer 114 may subscribe. In some examples, when a vehicle 118 or other telemetry consumer 114 subscribes to a telemetry data queue 146 (e.g., such as in a pub/sub environment), the GCT processing node 110 may be configured to push geo-converged telemetry data 122 stored in that queue to the vehicle decisioning system. For example, the transmission of geo-converged telemetry data 122 to a vehicle 118 or other telemetry consumer 114 may occur when the data are published to the queue (e.g., when data that meet certain location and data type criteria are available to provide to the vehicle/consumer). Or, according to another example, the transmission of geo-converged telemetry data 122 to a vehicle 118 or other telemetry consumer 114 may occur on a periodic basis.

In other examples, a vehicle 118 or other telemetry consumer 114 may be configured to pull relevant geo-converged telemetry data 122 from the GCT system 116. For example, the vehicle 118 or other telemetry consumer 114 may be configured to receive geo-converged telemetry data 122 from the GCT system 116 via subscribing to one or more telemetry data queues 146. As an example, a vehicle 118 or other telemetry consumer 114 may be configured to subscribe to receive geo-converged telemetry data 122, wherein subscription settings may define certain telemetry criteria or attributes (e.g., location range, telemetry data type, age of data) associated with making one or more decisions. That is, a vehicle 118 or other telemetry consumer 114 may subscribe to receive certain types of telemetry data 120 that are provided by various telemetry sources 102,112, such as other vehicles 118, that are proximate to the vehicle's/consumer's location (current or anticipated) and that may be correlated with other telemetry collected from telemetry sources proximate to the vehicle's/consumer's current or anticipated location.

As described above, proximity may be configurable and may be dependent on a decision made by or an automated function that may be performed by a vehicle 118 or other telemetry consumer 114. In some examples, a subscription may define a particular telemetry source 112 from which a vehicle/consumer may want to receive telemetry data 120. In other examples, a subscription may further define how a vehicle 118 or other telemetry consumer 114 may receive telemetry data (e.g., push, pull, frequency, notification of events or alerts). Subscription settings associated with a vehicle 118 or other telemetry consumer 114 may be stored in a subscription data store where the subscription settings may be accessed by the GCT system 116 for determining which telemetry to publish to a queue 146 and for determining which telemetry data points that may be correlated with other telemetry data points. In other examples, criteria defining the telemetry that a vehicle 118 or other telemetry consumer 114 may want may be defined in a request for the data. In an example aspect, the GCT system 116 may be configured to expose an API that a vehicle 118 or other telemetry consumer 114 can use to make an API call to request certain attributes of telemetry data or to request geo-converged telemetry data 122 published to one or more queues 146.

In some examples, when the GCT system 116 receives telemetry data 120, the data aggregator 136 may be operable or configured to analyze the telemetry data to determine whether there is a subscription that matches attributes of the received data (e.g., by analyzing the geolocation metadata, data type, sensor type, timestamp). For a matching subscription, the data aggregator 136 may publish the telemetry data in one or more queues 146. In some examples, the data aggregator 136 may be configured as a rules engine that evaluates telemetry data 120 based on a set of rules (e.g., subscription rules) corresponding to the defined attributes, and executes an action (e.g., publish telemetry data to a particular telemetry data queue 146) when certain conditions are met. For example, a configurable set of rules can be stored based on the subscription settings, which may include a rule to evaluate attributes (e.g., geolocation metadata and/or, telemetry data type) associated with a telemetry data item; and if the attributes are associated with a particular geographic area, telemetry data type, etc., the telemetry data item may be stored in a specific data queue 146. According to an example aspect, a particular telemetry data queue 146 may be associated with a particular decision that a vehicle 118 or other telemetry consumer 114 may be configured to make or a particular condition or conditions that the vehicle/consumer may be configured to monitor.

In various example aspects, the data aggregator 136 may include or be communicatively attached to a prediction engine 138 illustrative of a software application, module, or computing device operable or configured to perform predictive analytics as part of providing relevant data to telemetry consumers 106,114. According to an example, the prediction engine 138 may be embodied as a machine learning model that is trained with historical data that can be used by the data aggregator 136. For example, predictive analytics may be utilized to calculate the probability that an event will occur within a specific timeframe and/or within a specific geographic area based on historical data and/or training data. An example event may include a potential hazard. Another example event may be associated with an available number of parking spaces at a parking facility. The prediction engine 138 may be configured to analyze certain telemetry data types based on the predictions being determined. When an event is predicted, the data aggregator 136 may be configured to determine which telemetry consumers 106,114 the predicted event may be relevant to, and generate a notification to alert those consumers. In example aspects, relevance may correspond to geolocation. Determining which telemetry consumers 106,114 to alert may be based on subscription settings, where a telemetry consumer 106,114 may subscribe to receiving alerts for certain types of events that are predicted at a particular geographic location, within a particular area, or if the prediction includes a predicted path or area that affects the telemetry consumer 106, 114. In some example aspects, a criticality value may be assigned to received telemetry data 120 and/or a prediction based on the source, the type of telemetry data, and/or based off of how likely that data may be used by a vehicle 118 or other telemetry consumer 114 to make a critical or time-sensitive decision. For example, if telemetry data 120 are time-sensitive or are associated with a detected hazard for which a vehicle may need to react in real time or near-real time, a higher criticality value may be associated with the data than with non-time-sensitive data.

Based on a criticality value or on various configurations, the alert and/or associated telemetry data may be pushed to the telemetry consumer 106,114 or pulled by the consumer, which informs the consumer of the predicted event and enables the consumer to respond. In an example aspect, receiving an alert corresponding to a predicted event can enable the telemetry consumer 106,114 to proactively take some sort of action or corrective action (e.g., prior to the event occurring, to mitigate risk, for providing a functionality). As can be appreciated alerting telemetry consumers 106,114 of events that are predicted based on telemetry data 120 collected from a plurality of telemetry sources 102, 112 can enable telemetry consumers 106,114 to respond to events that the consumers may not be enabled to detect based on their own telemetry data 120, and/or may enable telemetry consumers to react to events, such as potential hazards, more quickly.

Figure 2:
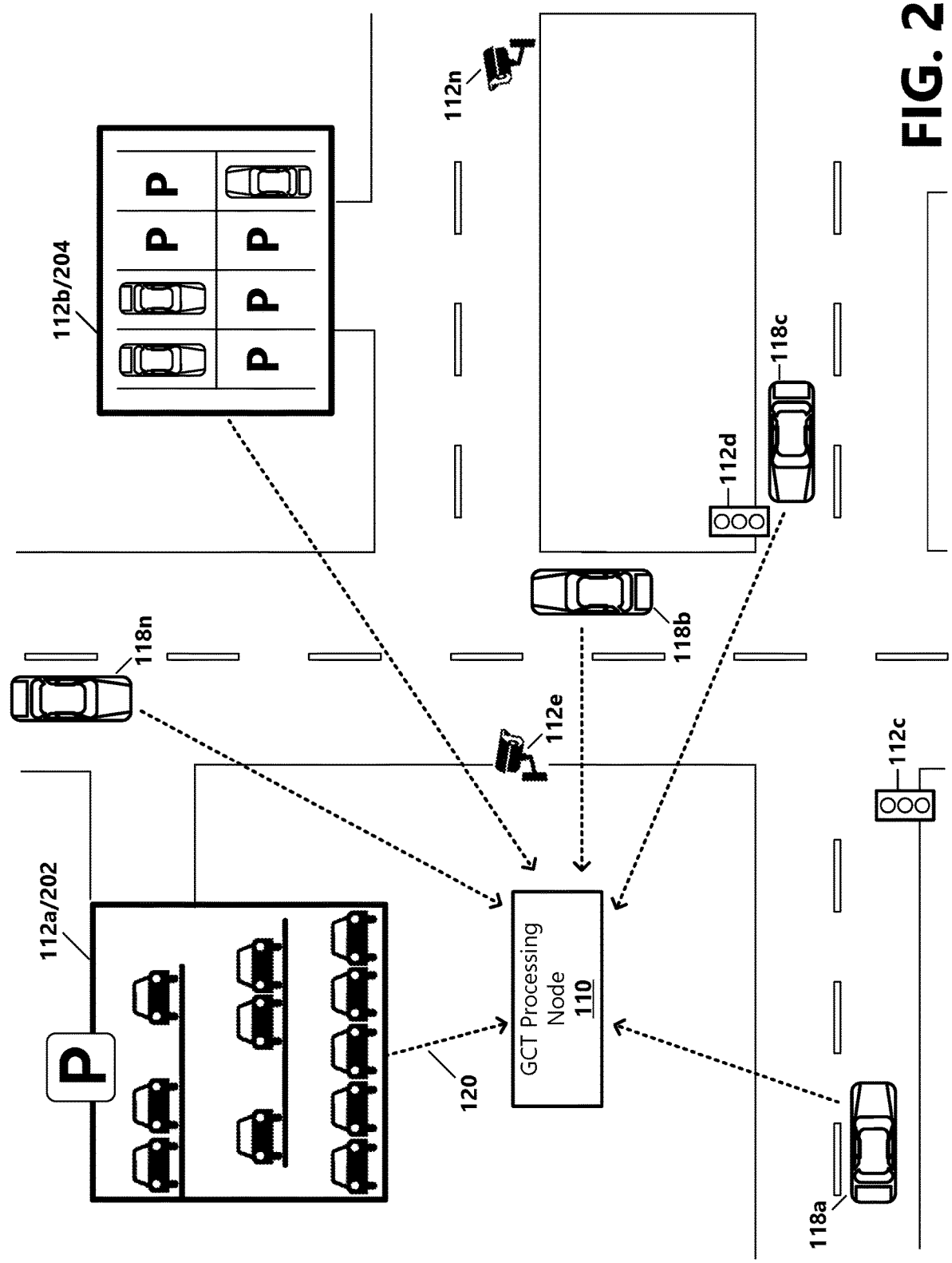
FIG. 2 is an illustration of an example implementation of the geo-converged telemetry system in an edge network.

An example event that the prediction engine 138 may predict may include a parking space availability prediction. For example and with reference to FIG. 2, a first telemetry source 112a embodied as a parking garage 202 may transmit telemetry data 120 to a GCT processing node 110 of the GCT system 116 that indicate a number of available parking spots in the garage 202. A second telemetry source 112b embodied as a parking lot 204 may also transmit telemetry data 120 to a GCT processing node 110 that indicate a number of available parking spots. Various vehicles 118a-n may be communication with and continually transmit telemetry data 120 to the GCT processing node 110 (or other GCT processing nodes) that may include navigation data indicating the parking garage 202 as a predicted (based on historical data) or planned destination and other data that may be used to determine the vehicles' current location and speed. Various other telemetry sources 112c-n, such as traffic control systems, camera, etc., may additionally provide telemetry data 120 that include data indicating a level of traffic flow and/or signal timing data. Based on the received telemetry data 120, the GCT system 116 may be able to predict whether a parking space may be available at the parking garage 202 for each of the various vehicles 118a-n based on a calculated estimated time of arrival of each vehicle. According to an example, the prediction of whether a parking space may be available for a particular vehicle 118 may be transmitted to the vehicle. For example, the vehicle 118 may subscribe to receiving geo-converged telemetry data 122 and/or predictions of parking space availability. Accordingly, the prediction engine 138 may publish the prediction and/or associated telemetry data to a particular queue 146 that the vehicles 118a-n may pull telemetry/predictions from and/or the GCT system 116 may push a notification to the vehicles 118a-n. For example, if the prediction indicates that a parking space at the parking garage 202 may likely not be available for a particular vehicle 118a based on a projected estimated arrival time of the particular vehicle and of projected estimated arrival times of other vehicles 118b-n, the particular vehicle 118a may make a decision to reroute to another parking facility (e.g., parking lot 204). In some examples, the vehicle 118a may pay for a service that enables the vehicle to reserve an available parking space at the parking garage 202. Accordingly, the vehicle 118a may automatically reserve an available parking space based on the prediction that a parking space that may be currently available may not be available for the vehicle at the vehicle's estimated arrival time.

According to an example aspect and with reference again to FIG. 1B, the data aggregator 136 may be operable or configured to truncate telemetry data 120. For example, based at least in part on defined subscription attributes, specific geo-converged telemetry data 122 may be transmitted to specific telemetry consumers 106, 114. That is, telemetry data 120 collected from various telemetry sources 102,112 in the edge network 105 may be truncated by the data aggregator 136 such that data that are not of a specific requested type or that are not proximate or locally-relevant to a telemetry consumer 106,114 are not published to specific queues 146 that the telemetry consumer may subscribe to, and thus are not transmitted to the consumer. Moreover, the data aggregator 136 may be further operable or configured to set a Time to Live (TTL) value to geo-converged telemetry data 122 to expire data that may no longer be relevant to telemetry consumers 106,114 and minimize the storage of non-relevant data. According to an example aspect, the TTL value may be set based on the telemetry data type or other factors.

According to an aspect, prior to transmitting geo-converged telemetry data 122 to a telemetry consumer 106,114, the data may be anonymized to protect the identity/privacy of the telemetry source 102,112 and its owner. The anonymizer 140 is illustrative of a software application, module, or computing device operable or configured to anonymize the collected telemetry data 120. For example, the anonymizer 140 may be utilized to remove personal identifying information associated with the telemetry data 120, while preserving other metadata, such as the geolocation metadata. As part of anonymizing telemetry data 120, the anonymizer 140 may utilize standard anonymization practices, such as attribute suppression, record suppression, character masking, pseudonymization, generalization, swapping, data perturbation, and the like.

Figure 3:
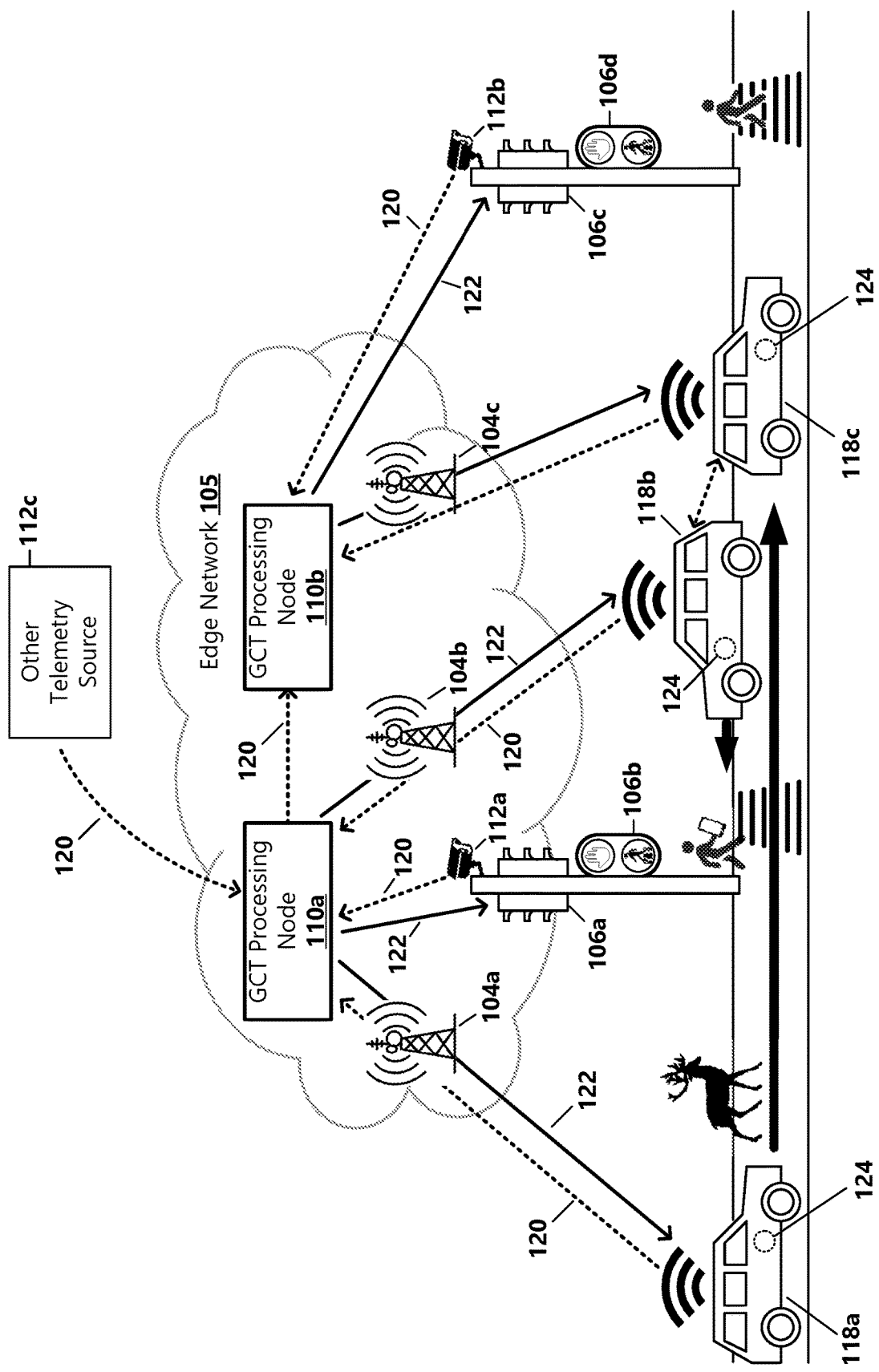
FIG. 3 is an illustration of another example implementation of the geo-converged telemetry system in an edge network.

FIG. 3 is an illustration showing an example implementation of the GCT system 116 in an edge network 105 in which benefits such as increased safety, energy efficiency, traffic flow efficiency, etc., may be provided. For example, a plurality of vehicles 118a,b,c may be in communication with one or more GCT processing nodes 110a,b via one or more network nodes 104a,b,c. For example, a first vehicle 118a may register with a first GCT processing node 110a for sending telemetry data 120 sensed by its various sensors 124 to the GCT system 116 and for receiving feeds of geo-converged telemetry data 122 that may be specific to a geographic area and that may be further specific to specific automation functionalities (e.g., automated driving functionalities, driver assistance functionalities, notification functionalities, navigation functionalities) associated with the first vehicle. As the vehicle 118a travels along a roadway, the vehicle may register with a second GCT processing node 110b based on the vehicle's location, and may receive feeds of geo-converged telemetry data 122 from the second GCT processing node 110b relevant to the vehicle's current location. The feeds of geo-converged telemetry data 122 may include telemetry data 120 provided by other vehicles 118bc and other telemetry sources 112a-c that may be converged based on geolocations of the data. The other telemetry sources 112 may include traffic sensors, cameras, pedestrian proximity sensors, weather services, etc. For example, telemetry data 120 that may be associated with a geographic area may be converged for providing a holistic telemetry-based representation of the geographic area. In some examples, the geographic area may be defined by coverage areas of particular network nodes 104. In other examples, the geographic area may include a particular intersection or section of road. In other examples, the geographic area may include a larger area including a plurality of intersections or a larger section of road. In other examples, the geographic area may include larger areas.

Geo-converged telemetry data 122 may enable the vehicle 118a to be better informed of the position of the other vehicles 118b,c, anticipated actions of the other vehicles 118b,c (e.g., navigation-related actions, braking, or other driving-related actions) or about potential hazards detected by the other vehicles 118b,c and/or other telemetry sources 112. For example, geo-converged telemetry data 122 provided to a vehicle 118 may provide the vehicle with access to data may otherwise not be sensed by the vehicle's own sensors 124. As an example, telemetry data 120 provided by a first vehicle 118a to the GCT system 116 may include navigation data that may be inferred by historical data, such a route normally taken by the first vehicle 118a at the same approximate time (e.g., a commute to work, a commute home from work), or that may be programmed into a navigation system 128 associated with the first vehicle 118a. For example, the navigation data may indicate that the first vehicle 118a is likely to take a next exit. The GCT system 116 may share this anticipated action with a second vehicle 118b such that the second vehicle may take an action (e.g., adjust its speed, change lanes, or other action) for accommodating the anticipated action of the first vehicle 118a for increased safety and/or optimized traffic flow. In other examples, the GCT system 116 may provide a vehicle 118 with information about a potential hazard before the vehicle's sensors 124 may be able to detect the hazard, which may provide the vehicle with more time to react to avoid the hazard. For example, the telemetry data 120 provided by other vehicles 118 and other telemetry sources 112 may provide an extended range of sensor data for a particular vehicle, and may allow for more informed decision making by the particular vehicle.

As previously mentioned, in addition to the vehicles 118a,b, various other telemetry consumers 106a-d may be configured to receive feeds of geo-converged telemetry data 122. For example, various traffic control systems, such as traffic lights, pedestrian crossing signals, swing lane controllers, etc., may receive relevant geo-converged telemetry data 122, and use the received data for controlling traffic signals. For example, a decision to control a traffic signal based on geo-converged telemetry data 122 may be associated with optimizing vehicle safety and/or traffic flow, increasing pedestrian traffic safety and/or traffic flow, avoiding hazards, etc. Depending on configuration settings, traffic flow may be optimized for a particular type of traffic (e.g., pedestrian traffic versus vehicular traffic), or in some example aspects, for particular individual vehicles 118 or other telemetry consumers 106. For example, based on geo-converged telemetry data 122, a traffic control system (other telemetry consumer 106) may be able to know that no pedestrians are sensed near an intersection, and thus can keep pedestrian cross walks set to "no crossing" to optimize vehicular traffic flow until one or more pedestrians are detected at or near the intersection. The traffic control system may be configured to optimize pedestrian traffic such that when a pedestrian is detected in an area, the traffic control system may adjust the timing of traffic control signals to stop vehicular traffic and provide a "walk" signal to pedestrians to allow the detected pedestrian to cross the intersection without having to stop and wait for the "walk" signal. Additionally, geo-converged telemetry data 122 may be provided to vehicles 118 approaching the intersection that may include known information about the presence of pedestrians and the timing of the traffic control signal, enabling a vehicle to adjust its speed such that the vehicle may not to come to a complete stop or to adjust its speed such that the vehicle can safely come to a stop for allowing the pedestrians to cross.

In other example aspects, a pedestrian crosswalk may include signage or a traffic control signal that gives priority to pedestrians and directs oncoming traffic to stop for pedestrians in the crosswalk. However, the STP system 116 may be able to determine, based on geo-converged telemetry data 122, that a vehicle 118 traveling at a particular rate of speed may not be able to stop in time for the pedestrian. Accordingly, the STP system 116 may communicate with the traffic control signal to not engage the "walk" signal until the vehicle 118 passes through or to warn the pedestrians about the oncoming traffic.

In some examples, a vehicle 118 or another telemetry consumer 106 may pull telemetry data from the GCT system 116 via a query for geo-converged telemetry data 112. For example, the vehicle 118 may request geo-converged telemetry data 112 that are relevant to a particular location, wherein the particular location may vary depending on the vehicle's current location and a projected future location (e.g., based on navigation data provided by the vehicle). The other telemetry consumer 106 may be a stationary device, such as a traffic control signal, and may request geo-converged telemetry data 112 that are relevant to a particular location, wherein the particular location may be fixed. In other examples, a GCT processing node 110 may push geo-converged telemetry data 112 to vehicles 118 and/or other telemetry consumers 106 subscribed to receive geo-converged telemetry data.

Figure 4B:
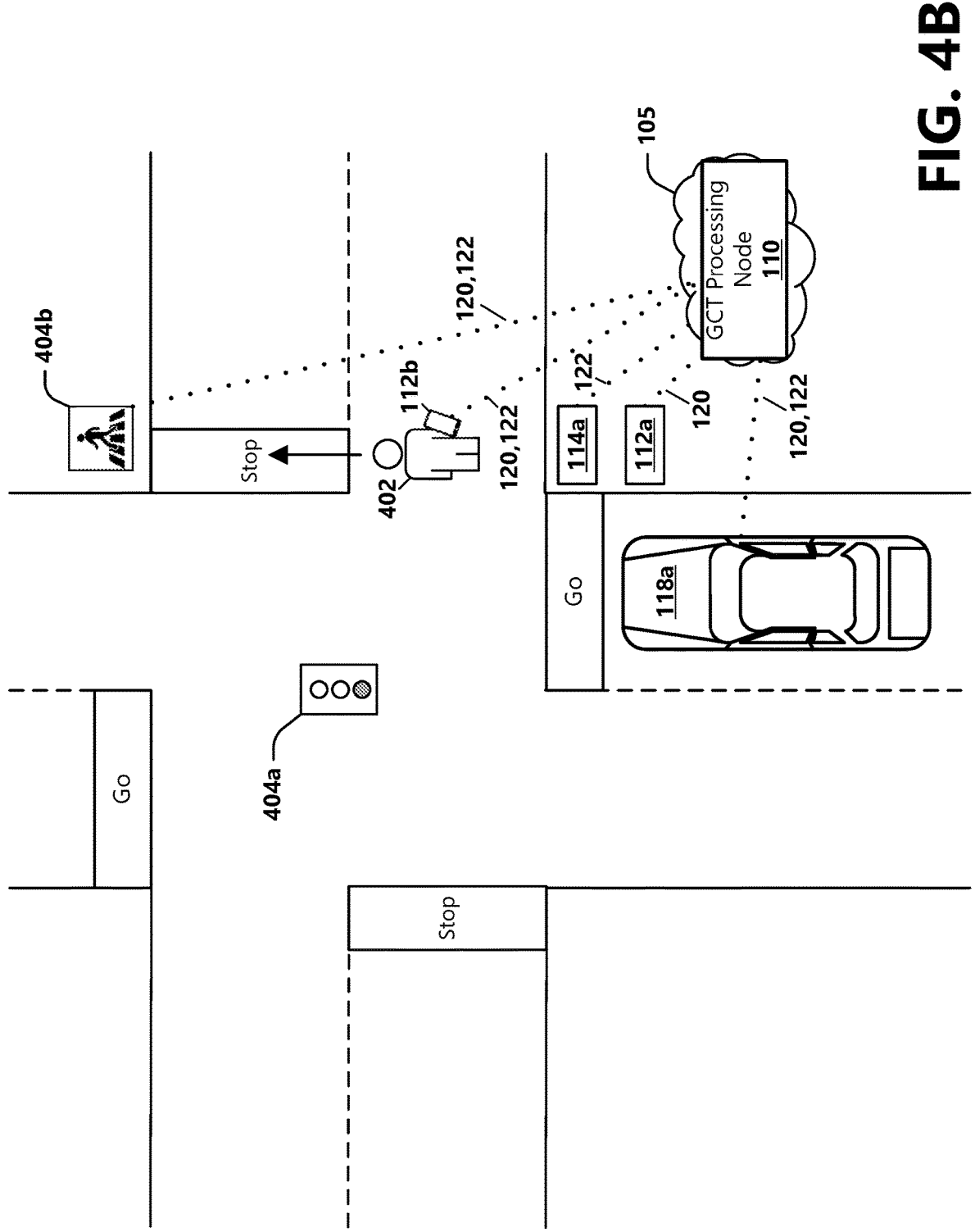

FIGS. 4A and 4B are illustrations showing an example implementation of the GCT system 116 in an edge network 105 in which improved pedestrian traffic flow and safety may be provided. For example and as illustrated in FIG. 4A, a pedestrian 402 may approach a particular geographic location/area, such as an intersection. A first telemetry source 112a, such as a proximity sensor, camera, or other type of sensor in communication with a GCT processing node 110 of the GCT system 116 may be located at or near the intersection. Various vehicles 118a,b and other telemetry sources 102,112, such as vehicles and the pedestrian's mobile phone, may also be in communication with the GCT system 116. The various vehicles 118 and the one or more telemetry sources 112 may transmit telemetry data 120 to one or more GCT processing nodes 110 of the GCT system 116 that may indicate the location of the pedestrian 402, the pedestrian's anticipated route through the intersection, the location and route of any approaching vehicles 118, etc. The various telemetry data 120 may be processed by the GCT processing node(s) 110, predictions may be made on the processed telemetry data, and the geo-converged telemetry data 122 and/or predictions may be transmitted to one or more telemetry consumers 114. For example and with reference to FIG. 4B, the geo-converged telemetry data 122 and/or predictions may be received by a traffic control system (data consumer 114a) associated with the intersection that may use the received data/predictions to control an associated traffic light 404a and a pedestrian crossing signal 404b such that a 'walk' signal may be provided to the pedestrian 402 as the pedestrian approaches the intersection and the traffic light 404a may stop oncoming traffic, allowing the pedestrian to safely and efficiently cross the intersection without having to stop and wait for the pedestrian crossing signal 404b to cycle.

Figure 5A:
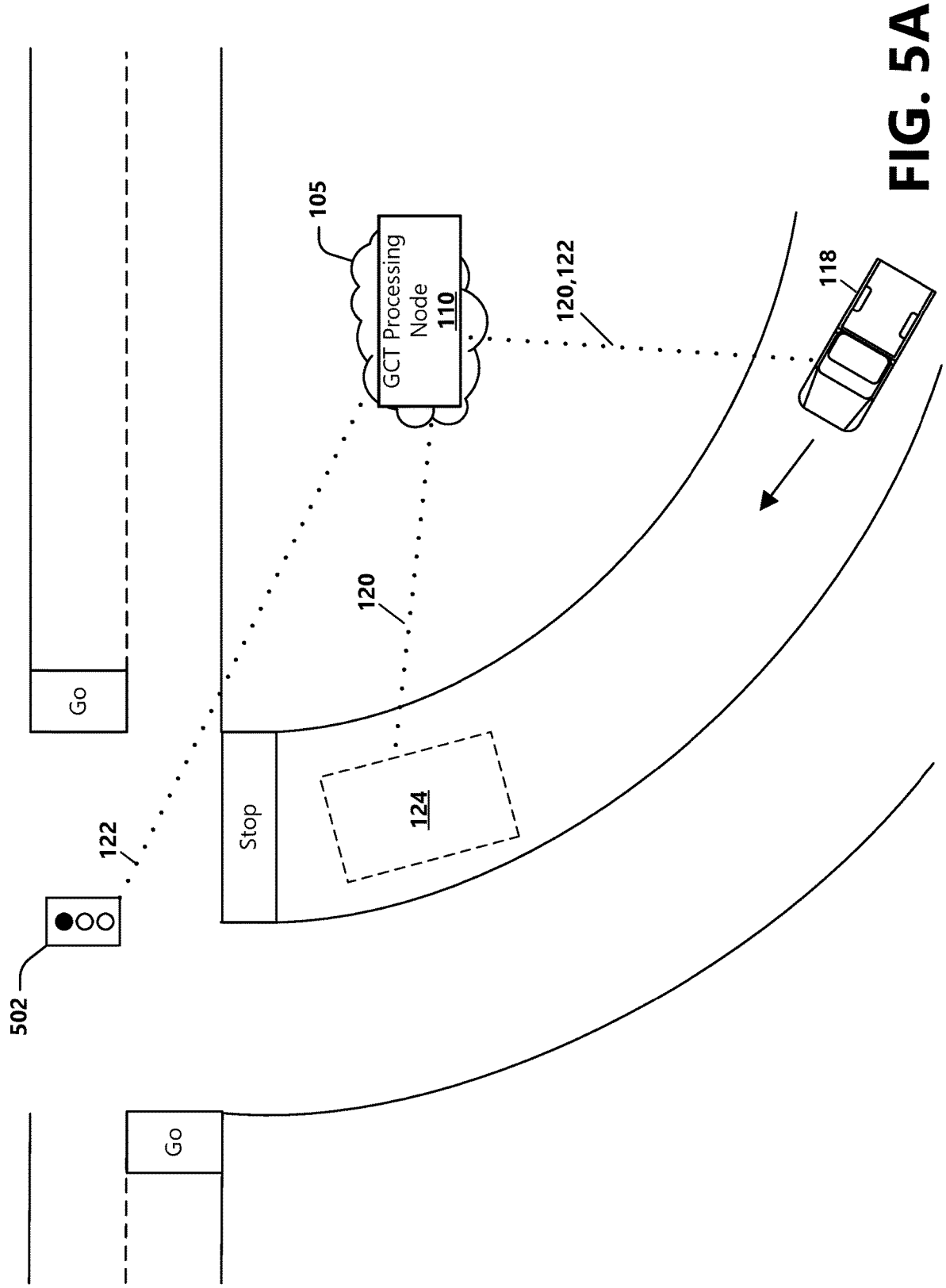
FIGS. 5A and 5B are illustrations of another example implementation of the geo-converged telemetry system in an edge network.
Figure 5B:
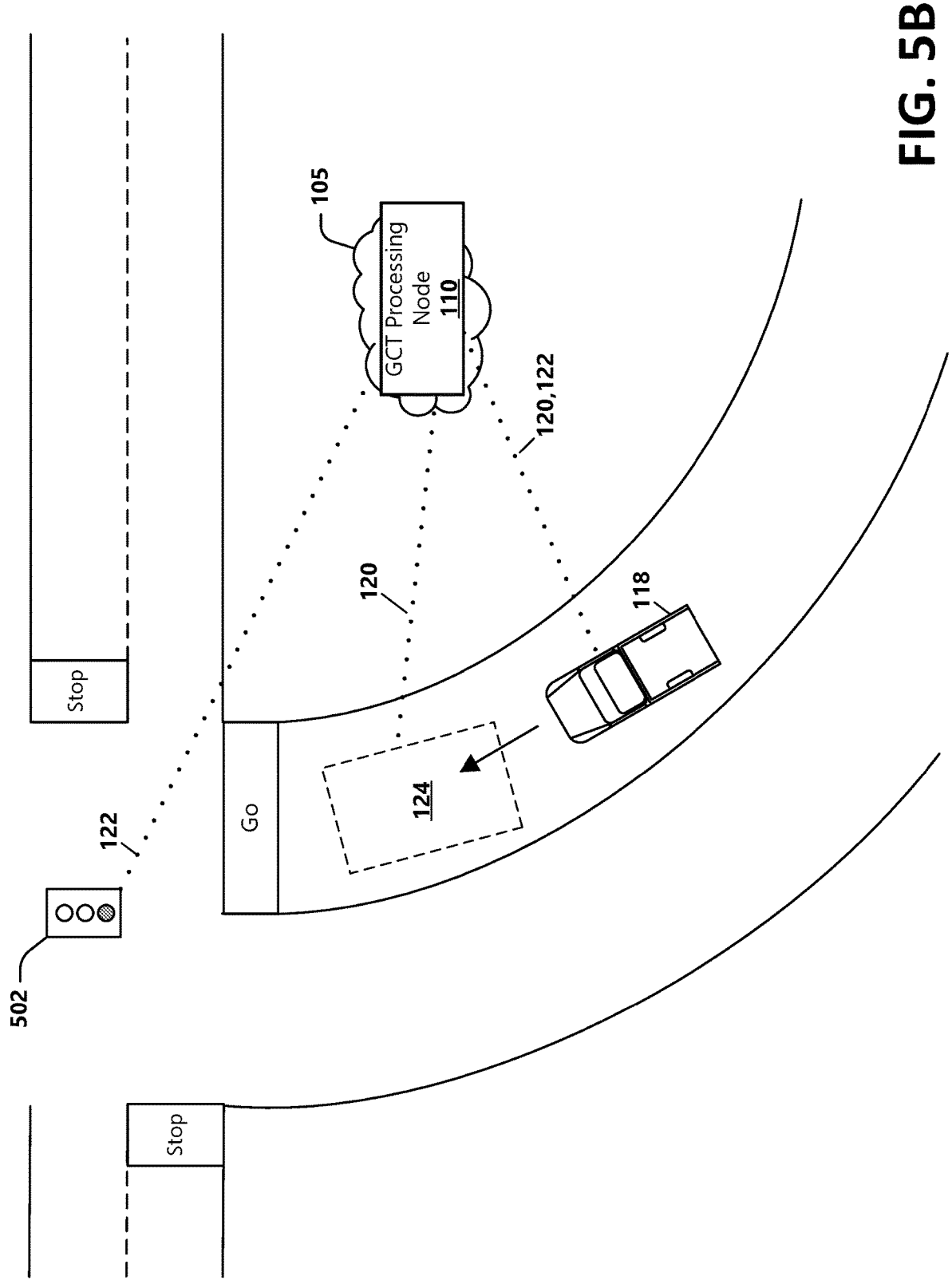

FIGS. 5A and 5B are illustrations showing an example implementation of the GCT system 116 in an edge network 105 in which improved vehicular traffic flow efficiency and energy efficiency may be provided. For example and as illustrated in FIG. 5A, a vehicle 118 may approach a particular geographic area, such as an intersection comprising a traffic control signal 502 illustrative of a telemetry consumer 114. According to the example scenario, there may not be other vehicles in, near, or approaching the intersection. For example, the vehicle 118 may be travelling through the intersection at a non-peak travel time when traffic flow is minimal. Currently, without implementation of aspects of the present disclosure, the traffic control signal 502 may be configured on a timer and/or may be communicatively connected to a vehicle detection sensor 124, such as an induction loop system, microwave radar detector, or camera. For example, when the detection of a vehicle 118 is conveyed by the vehicle detection sensor 124 to a signal controller of the traffic control signal 502, it may cause a change in the traffic signal. Accordingly, it may be likely that the vehicle 118 may have to come to a stop at the intersection and wait for the traffic control signal 502 to switch. Aspects of the present disclosure may be utilized to optimize traffic flow by continually collecting telemetry data 120 from the vehicle 118 and providing geo-converged telemetry data 122 to the traffic control signal 502 that may inform the traffic control signal of the approaching vehicle 118. Accordingly, the traffic control signal 502 may control the signal to provide the approaching vehicle 118 with a 'go' signal prior to the vehicle arriving at the intersection. Therefore, the vehicle 118 may avoid having to decelerate or stop, which may reduce the vehicle's travel time and increase the vehicle's energy efficiency.

Figure 6A:
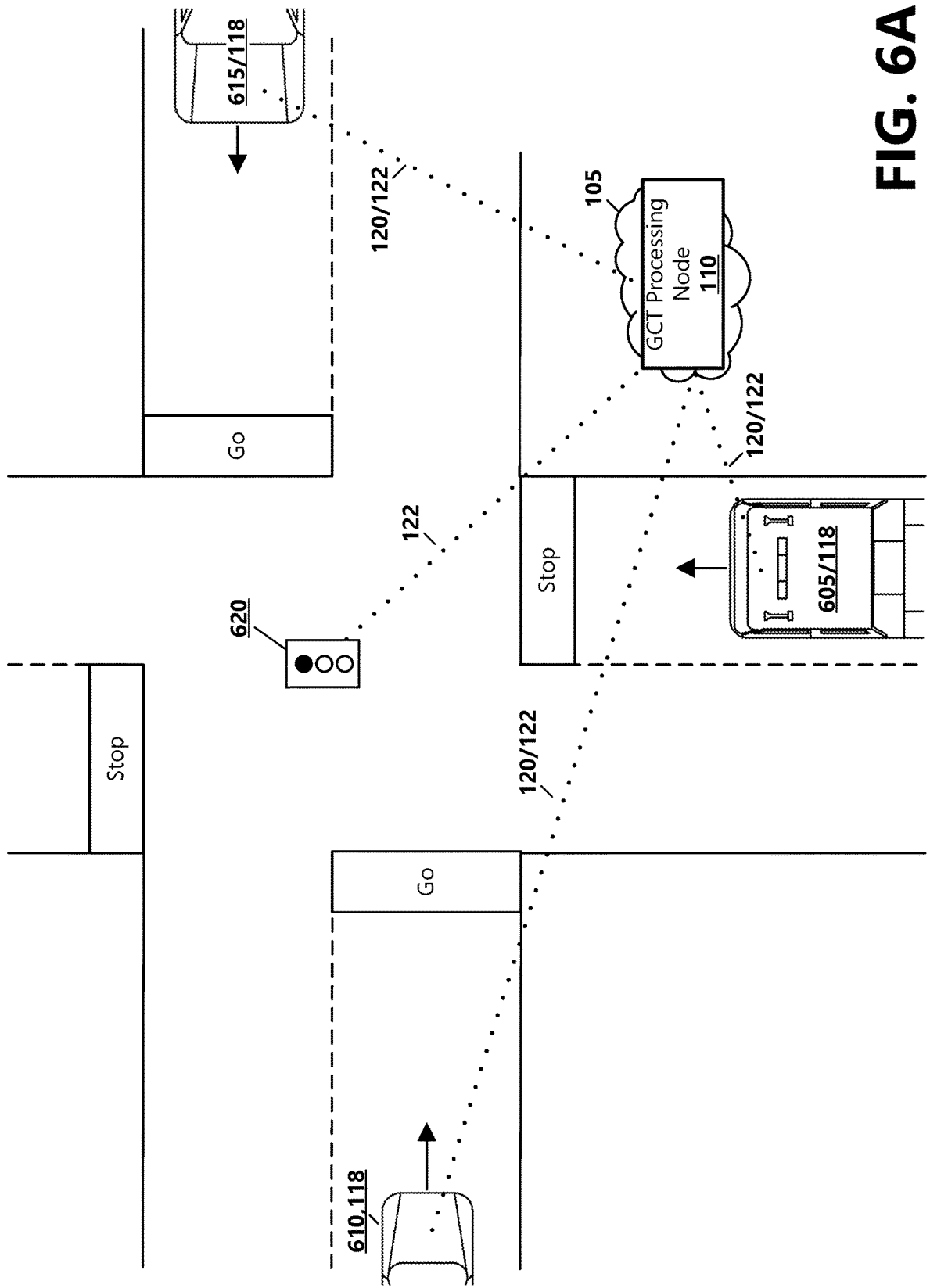
FIGS. 6A and 6B are illustrations of another example implementation of the geo-converged telemetry system in an edge network.
Figure 6B:
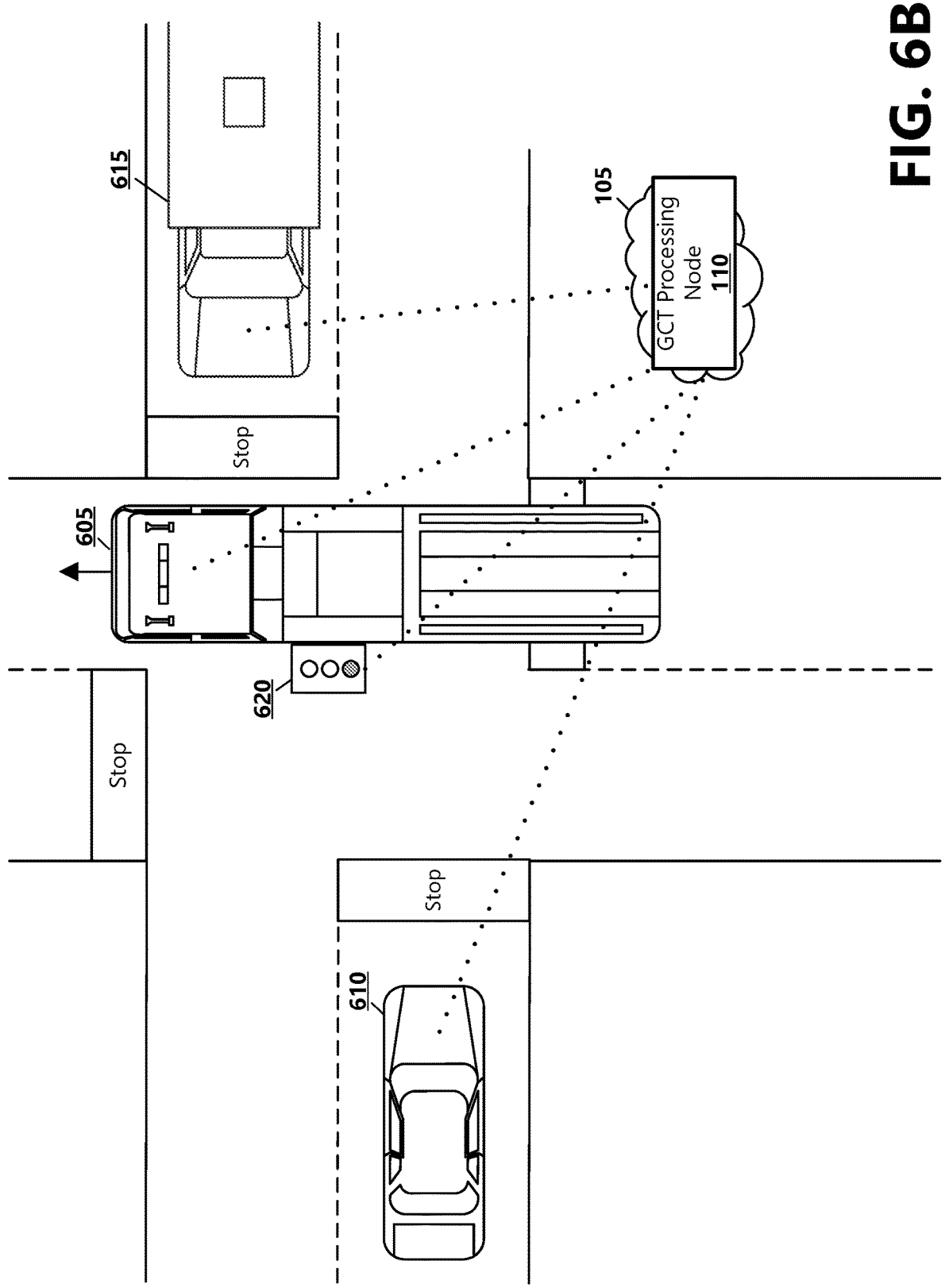

FIGS. 6A and 6B are illustrations showing an example implementation of the GCT system 116 in an edge network 105 in which optimized response time of emergency vehicles may be provided. For example and with reference to FIG. 6A, a vehicle 118 embodied as an emergency vehicle 605 is shown approaching an intersection. For example, the emergency vehicle 605 may be on an emergency call. Currently, without implementations of the present disclosure, intersections are oftentimes a cumbersome and dangerous part of a route for an emergency vehicle 605 responding to an emergency call, where the emergency vehicle may be at a higher risk of being involved in a collision with another vehicle (610, 615). Accordingly, emergency vehicles 605 may need to proceed slowly through intersections to help mitigate this risk. Additionally, an intersection may become clogged by other vehicles (610, 615) trying to get out of the emergency vehicle's 605 path. This may occur due in part to drivers of the other vehicles (610, 615) guessing at which of the multiple possible routes the emergency vehicle 605 may take as they try to maneuver out of the way.

According to an aspect, the GCT system 116 may be implemented to improve safety and flow of emergency vehicles 605 traversing intersections. For example, an emergency vehicle 605 may be in communication with one or more GCT processing nodes 110 of the GCT system 116, with which the emergency vehicle may share telemetry data 120. The shared telemetry data 120 may include navigation/routing information and information that the emergency vehicle 605 is responding to an emergency call. Other vehicles 610,615 may additionally be in communication with the GCT system 116, and may share telemetry data 120 with the GCT system. The GCT system 116 may be utilized to process and converge the received telemetry data 120 based at least in part on geographic location metadata applied to the data. In an example aspect, the GCT system 116 may be configured to provide geo-converged telemetry data 122 to a traffic control signal 620 that controls traffic flow at the intersection, wherein the geo-converged telemetry data may include a notification of the approaching emergency vehicle 605. The geo-converged telemetry data 122 may also include information about the other vehicles 610,615 approaching the intersection In an example aspect and as illustrated in FIG. 6B, based on geo-converged telemetry data 122 provided to the traffic control signal 620, the traffic control signal may stop traffic flow in all directions or may stop traffic flow across the intersection except for the traffic lane in which the emergency vehicle 605 is traveling for minimizing the likelihood of a collision as the emergency vehicle traverses the intersection. In some examples, the geo-converged telemetry data 122 may include estimated times that the emergency vehicle 605 and the other vehicles may arrive at the intersection. Based on this information, the traffic control signal 620 may time the signaling such that an approaching vehicle 610,615 may be allowed to pass through the intersection if it is projected that the approaching vehicle 610,615 can clear the intersection before the arrival of the emergency vehicle 605. In another example aspect, the GCT system 116 may be configured to provide geo-converged telemetry data 122 to the other vehicles 610,615, which may include information informing the other vehicles of the approaching emergency vehicle 605 and, in some examples, about the other vehicles in the vicinity. For example, the other vehicles 610,615 may use the geo-converged telemetry data 122 to determine an optimal location to move to allow passage of the emergency vehicle 605.

Figure 7A:
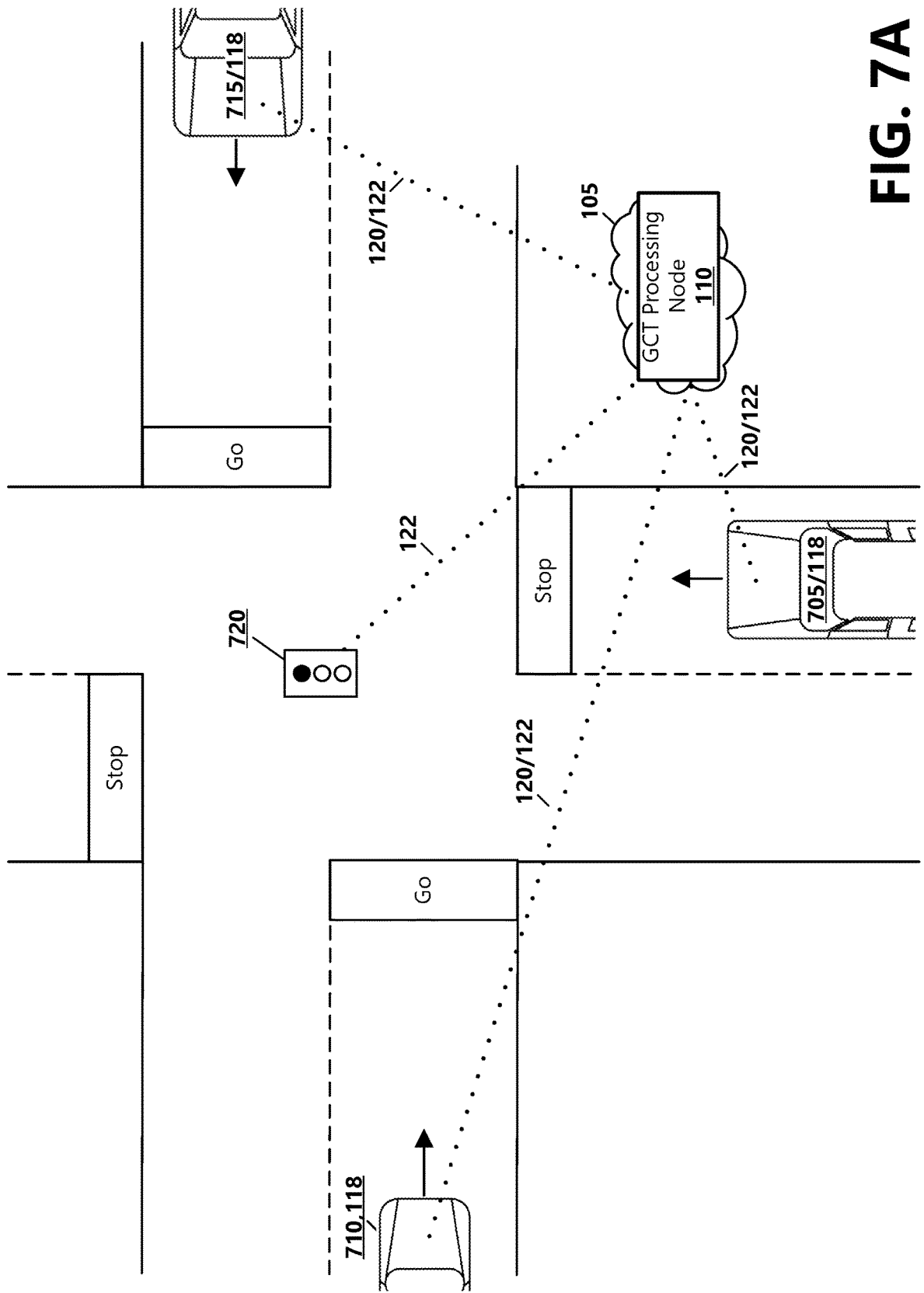
FIGS. 7A and 7B are illustrations of another example implementation of the geo-converged telemetry system in an edge network.
Figure 7B:
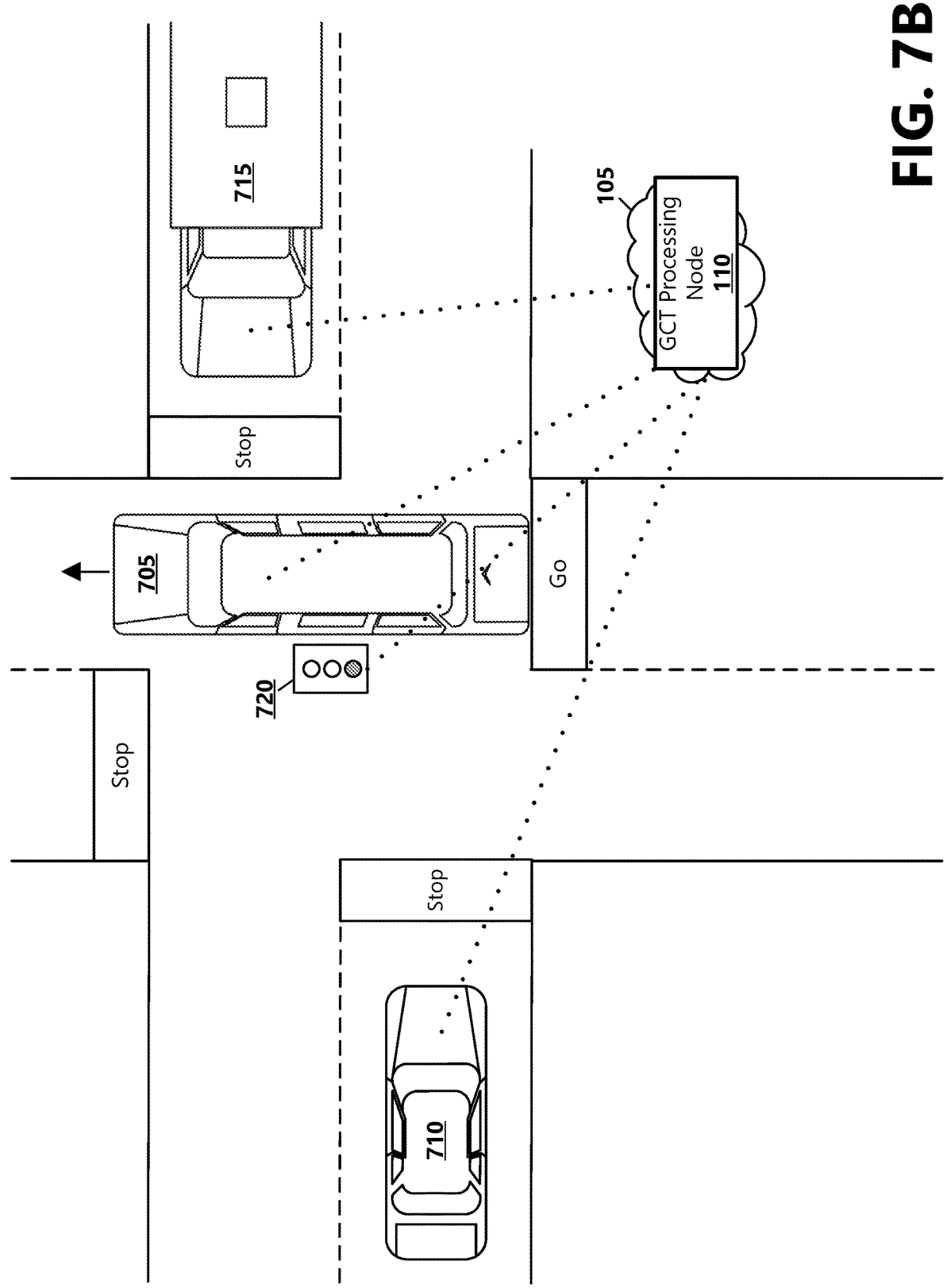

FIGS. 7A and 7B are illustrations showing an example implementation of the GCT system 116 in an edge network 105 in which priority access subscription service may be employed. For example and with reference to FIG. 7A, transient vehicle 118 embodied as a first vehicle 705 may subscribe to a service that may be enabled by the GCT system 116 that may reserve an optimized route for the vehicle. The first vehicle 705 may be in communication with a GCT processing node 110 of the GCT system 116, with which the vehicle may share telemetry data 120. Other vehicles (e.g., a second vehicle 710 and a third vehicle 715) may also be in communication with the same or other GCT processing nodes 110 and may share telemetry data 120 with the GCT system 116. The shared telemetry data 120 may include information about the vehicles' locations, destinations, and routes, wherein the destinations and/or routes may be input/programmed or inferred/learned based on historic data. Based on the received telemetry data 120, the GCT system 116 may identify one or more traffic control systems (e.g., traffic signal lights 720, pedestrian crossing signals, swing lane controllers) along the first vehicle's 705 route and may determine an estimated time the first vehicle may arrive at each of the traffic control systems. Further, based on the received telemetry data 120, the GCT system 116 may be able to determine control actions and timing of the one or more traffic control systems that may optimize the first vehicle's 705 travel time based on the first vehicle's priority access subscription. According to an example, the GCT system 116 may use the telemetry data 120 provided by the other vehicles 705,715 to determine control actions and timing of the one or more traffic control systems 720 that may additionally minimize impact on the other vehicles 710,715. For example and with reference now to FIG. 7B, the GCT processing node 110 may provide geo-converged telemetry data 122 to the one or more traffic control signals that include the determined control actions and timing information for optimizing the first vehicle's 705 travel time. Accordingly, based on the received geo-converged telemetry data 122, the one or more traffic control signals may adjust their traffic control actions and timing to provide optimized travel flow for the first vehicle 705. For example, a traffic signal light 720 may reserve a green light signal for the first vehicle 705 as the first vehicle approaches the signal.

In example aspects, the GCT system 116 may be configured to use various machine learning technologies to learn from collected telemetry data 120 over time (i.e., historical data) for identifying patterns, predicting outcomes, etc. For example, the GCT system 116 may identify patterns associated with a vehicle 118 that follows a repeated route on a repeated basis and use those identified patterns to predict or infer a route the vehicle 118 may take in the future. According to an example, a route may be identified or determined by the GCT system 116 by receiving the telemetry data 120 from the vehicle's GPS system or based on the network nodes 104 and/or GCT processing nodes 110 with which the vehicle is in communication. Based on learned patterns from collected telemetry data 120 and, in some examples, other training data, the GCT system 116 may be enabled to determine actions that can be performed by various telemetry consumers 106,114 to optimize traffic flow, minimize travel time, increase safety, increase energy efficiency, etc.

Figure 8:
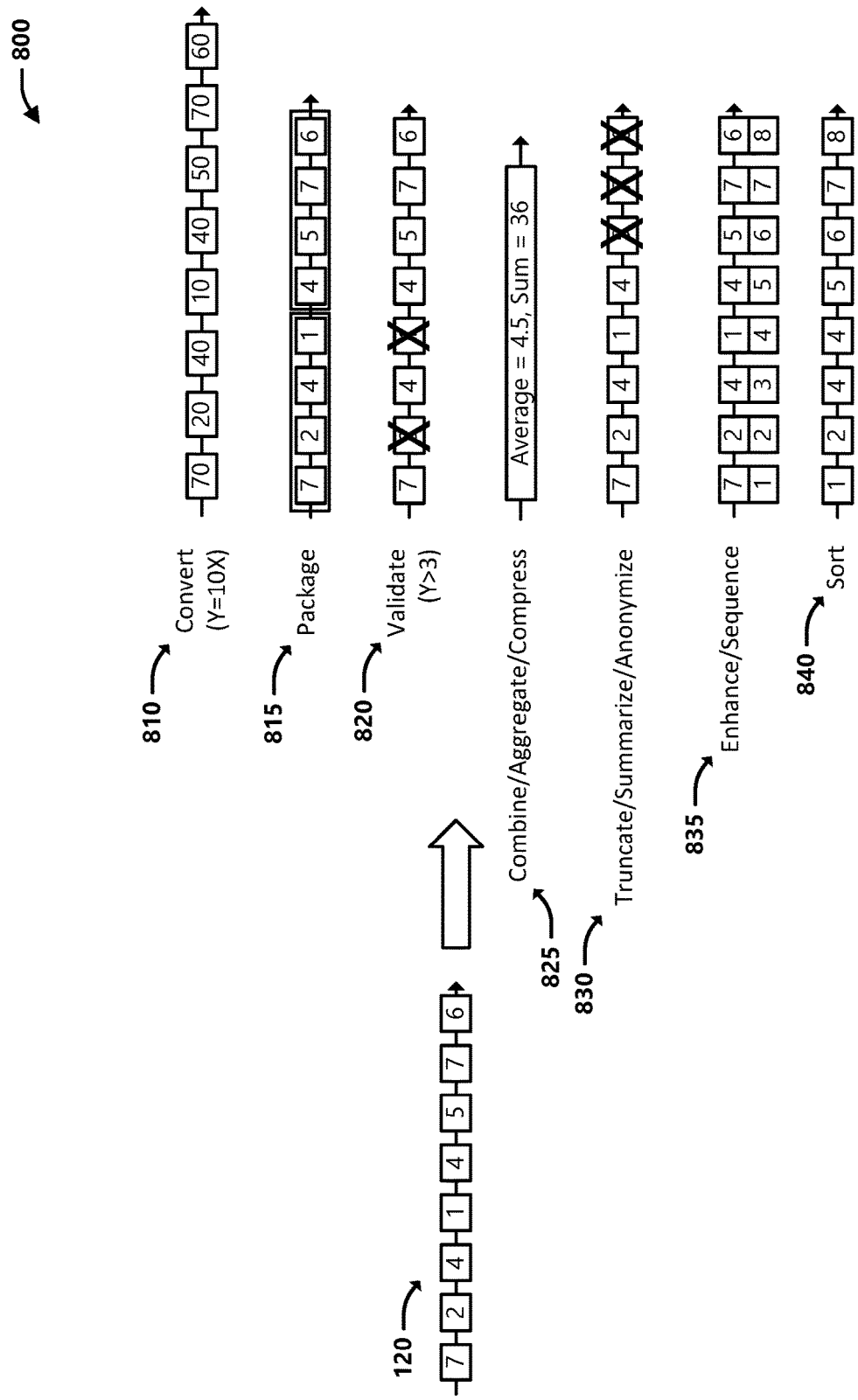
FIG. 8 is a block diagram illustrating example data processing operations according to an embodiment.

With reference now to FIG. 8, various example data processing operations are that may be performed by the data aggregator 136 and/or other components of the GCT system 116 are illustrated. For example, telemetry data 120 that are received by the GCT system 116 are depicted in FIG. 8 as a string of data, where each box may represent a data point, a data bit, a data byte, a data file, or other similar data container. For example, processing telemetry data 120 can include one or a combination of: converting the data, packaging the data, validating the data, combining the data, truncating the data, enhancing the data, and sorting the data, among other data processing operations. A first data processing example shows received telemetry 120 being converted 810 based on a prescribed function. For example, converting data can include changing file types, modification of the data by functions, changing the format of the data, etc. According to an example aspect, the data aggregator 136 may be configured to convert telemetry data 120 into a format utilized by a particular vehicle 118 or other telemetry consumer 114.

A second data processing example shows telemetry data 120 being packaged 815 into blocks containing a plurality of data points. For example, packaging data may allow for smaller parts of a data string to be transferred and stored at a faster rate than otherwise could be done with the entire data sting.

A third data processing example shows telemetry data 120 being validated 820 to ensure it adheres to a set of rules or requirements for the data. For example, the data aggregator 136 may be configured to validate data to ensure accuracy or structure according to a set of rules prior to publishing the data to a queue 146.

A fourth data processing example shows telemetry data 120 being combined, aggregated, and/or compressed 825. Combining data may allow for the data to be represented by fewer data points, thus making the overall size of the data smaller. In some examples no data are lost, such as in lossless compression; while in other examples, such as in the illustrated example, the data may be represented by another value, such as the average or the sum of a plurality of received data. For example, the GCT system 116 may be configured to determine an average value of received telemetry data 120, and include the average value in geo-converged telemetry data 122 or use the average value for predictions.

A fifth data processing example shows telemetry data 120 being truncated, summarized, and/or anonymized 830. For example, certain data points may be truncated or culled from the data. These data points may not include relevant information, or may not be relevant based on location, time, etc., and may be included in geo-converged telemetry data 122 or for use in making predictions. In an anonymization example, personal identifiable data may be removed from telemetry data 805 to allow for use of the data without compromising the identity of the telemetry source 102,112 or the owner of the telemetry source. In a summarization example, redundant data or data that may be determined as substantially similar may be removed from the data prior to publishing the data to a queue 146.

A sixth data processing example shows telemetry data 120 being enhanced and/or sequenced 835. In the example shown, a data identifying tag is added to the data. This tag can include identifiers such as metadata, device identification, timestamps, and sequence number, among other data identifiers. For example, a tag can be utilized as a cross-reference to find associated data.

The seventh data processing example shows telemetry data 120 being sorted 840. The example depicts the initial telemetry data 120 getting sorted into ascending order. Other sorting schemes can be implemented, such as descending order, odd-even, alpha-numeric, or based on a tag added in an enhancing operation 835, such as based on a timestamp, location, or telemetry source identifier. Another data processing example may include correlating various types of data for identifying characteristics of a location. Other types of data processing operations are possible and are within the scope of the present disclosure.

Figure 9:
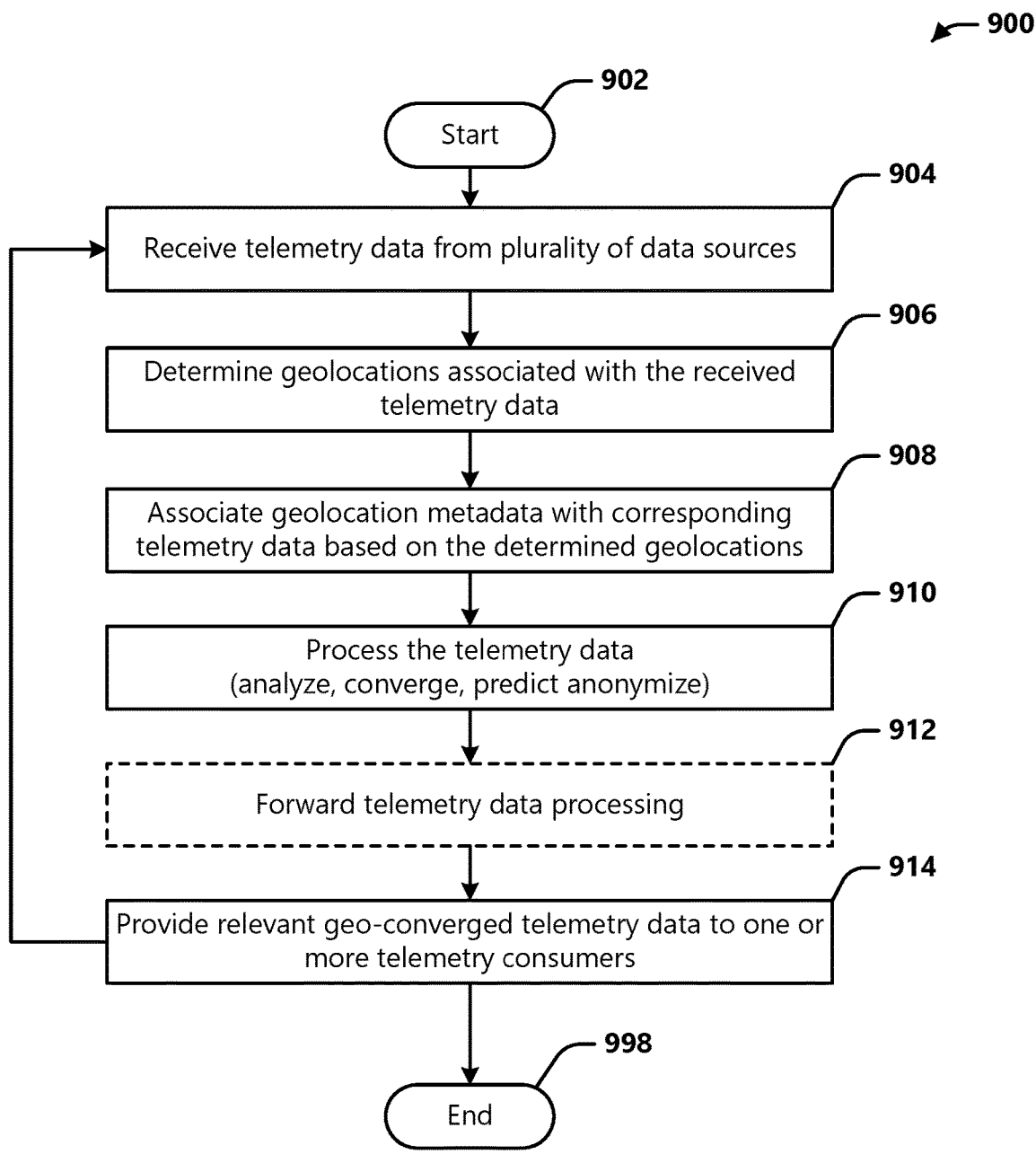
FIG. 9 is a flow diagram depicting general stages of an example process for providing geo-converged telemetry in accordance with some embodiments.

FIG. 9 is a flow diagram depicting general stages of an example method 900 for providing geo-converged telemetry data 122 in accordance with an embodiment. The method 900 starts at OPERATION 902 and proceeds to OPERATION 904, where a GCT processing node 110 of the GCT system 116 may receive telemetry data 120 from a plurality of telemetry sources, which may include various vehicles 118 and various other telemetry sources 112 such as traffic control/monitoring systems, parking automation/guidance systems, parking meters, weather services, social media systems, or other systems that are configured to provide telemetry data 120 associated with a particular area or system. According to an example aspect, the various vehicles 118 and other telemetry sources 112 may continually transmit telemetry data 120 to the GCT system 116. The various vehicles 118 and one or more of the various other telemetry sources 112 may communicate wirelessly with one or more network nodes 104 via which transmissions of telemetry data 120 may be sent to one or more GCT processing nodes 110. For example, various vehicles 118 may transmit telemetry data 120 collected from various integrated sensors that may include information about the vehicles' surroundings (e.g., sensed objects) and information about the vehicles, which may include navigation information (e.g., location, speed, route, direction). Other telemetry sources 112 may additionally provide telemetry data 120 including information indicating the state of the sources' surroundings.

At OPERATION 906, geolocations associated with the received telemetry data 120 may be determined by the geotagging engine 134. In some examples, the geolocation may be determined based on the physical location of network hardware, such as the network node 104, via which the telemetry data 120 may be transmitted to the GCT system 116. In other examples, the telemetry data 120 may include geolocation information, such as location information provided by a GPS sensor. In yet another example, the geolocation may be determined via one or more pinpointing methods (e.g., GPS triangulation, cell tower triangulation, WI-FI positioning), where a vehicle 130 may be in communication with multiple network nodes 104 and the vehicle's location (and thus the a location associated with the telemetry data 120) may be determined based on signal strength data and/or ping data provided by the node and known physical locations of the nodes 104.

At OPERATION 908, a geolocation metadata tag may be associated with corresponding telemetry data 120 based on the geolocations determined by the geotagging engine 134, and the data may further be stored in a data lake 130.

At OPERATION 910, the data aggregator 136 may analyze the received telemetry data 120, and various telemetry data items may be correlated and converged based at least in part on the geolocation metadata. For example, telemetry data 120 that are relevant to a particular geographic area may be correlated and converged for generating geo-converged telemetry data 122 that provide a holistic view of the geographic area. Additionally, the telemetry data 120 may be analyzed for detecting objects, potential hazards, or other situations to which a telemetry consumer 106,114 may need to or be configured to take a responsive action (e.g., perform a driving feature, provide a notification, control a signal, perform an automated function). In some examples, a prediction engine 138 may use predictive analytics to determine a probability that an event (e.g., potential hazard, situation associated with a responsive action) may occur within a specific timeframe and/or within a specific geographic area. At OPERATION 910, the geo-converged telemetry data 122 may be anonymized to remove personal or other identifying information for safeguarding privacy.

At OPERATION 912, processing of telemetry data 120 provided by a particular vehicle 118 may be performed by more than one GCT processing node 110 depending on the vehicle's location. For example, based on an anticipated location of the vehicle 118 at a particular time, the telemetry data 120 may be forwarded to another GCT processing node 110 such that processing is performed near the vehicle 118 for minimizing latency.

At OPERATION 914, relevant geo-converged telemetry data 122 may be provided to one or more vehicles 118 or other telemetry consumers 114 for providing data about a geographic area to the vehicles/consumers that the vehicles/ consumers may not typically have access to or for providing data earlier than a vehicle/consumer may be able to sense the data itself. As can be appreciated, as a vehicle 118 moves and its location is continually updated, the data that are determined to be relevant to may change continually. In some examples, geo-converged telemetry data 122 may be pushed to one or more vehicles 118 or other telemetry consumers 114 based on relevance to the vehicle/consumer. For example, relevance may be based on geographic location, telemetry data type, telemetry consumer type, etc. In some examples, the geo-converged telemetry data 122 may be published to one or more queues 146 based on a set of criteria, wherein a vehicle 118 or other telemetry consumer 114 may be configured to receive data published to the one or more queues. In other examples, a vehicle 118 or other telemetry consumer 114 may query the GCT system 116 for geo-converged telemetry data 122 that are geographically-relevant to the vehicle/consumer and that may be associated with data that the vehicle/consumer may evaluate for making a decision to perform a responsive action. The method 900 ends at OPERATION 998.

Figure 10:
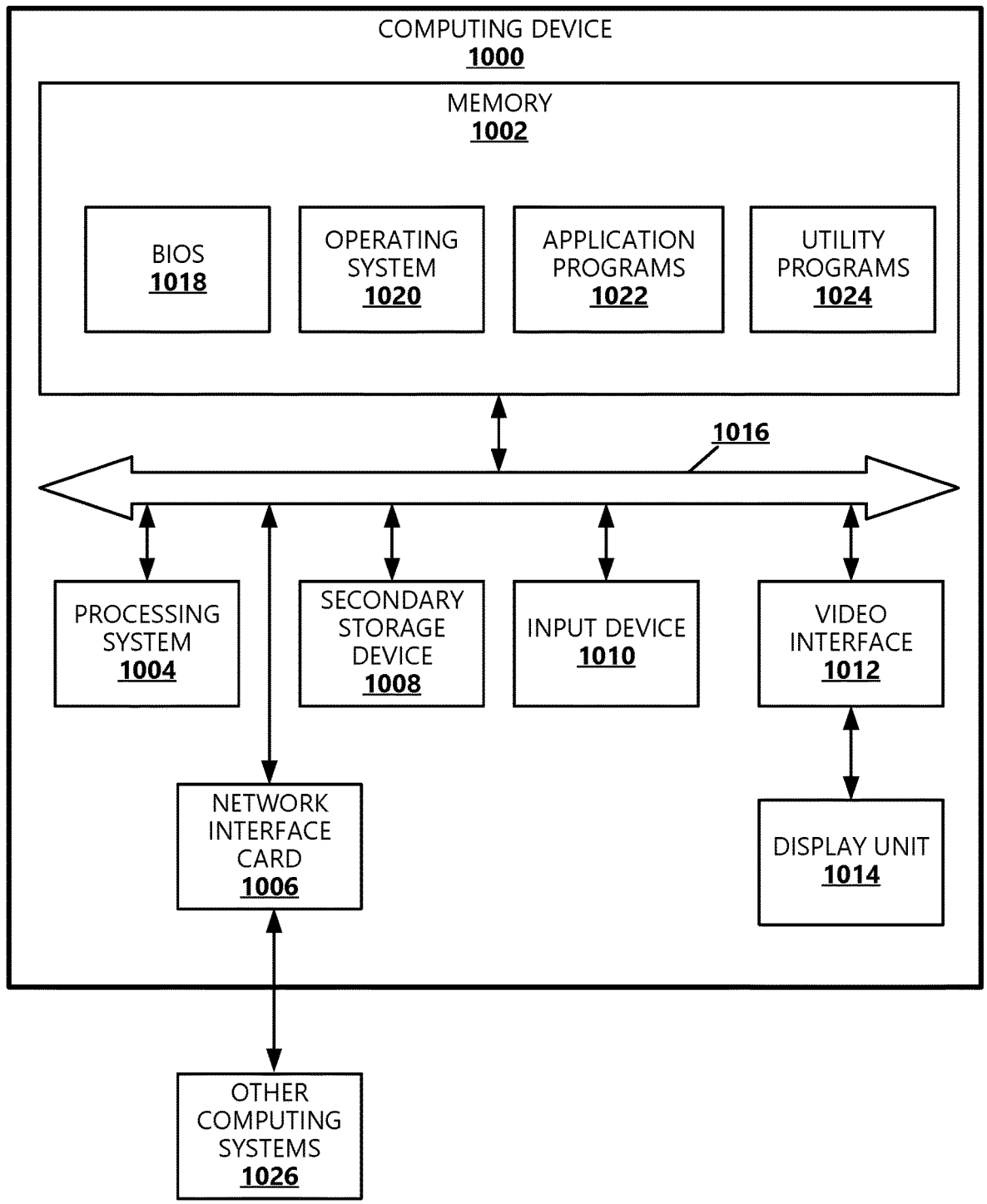
FIG. 10 is a block diagram illustrating example physical components of a computing device or system with which embodiments may be practiced.

FIG. 10 is a block diagram illustrating example physical components of a computing device or system 1000 with which embodiments may be practiced. It should be appreciated that in other embodiments, different hardware components other than those illustrated in the example of FIG. 10 may be used. Computing devices may be implemented in different ways in different embodiments. For instance, in the example of FIG. 10, the computing device 1000 includes a processing system 1005, memory 1002, a network interface 1006 (wired and/or wireless), a secondary storage device 1008, an input device 1010, a video interface 1012, a display unit 1015, and a communication medium 1016. In other embodiments, the computing device 1000 may be implemented using more or fewer hardware components (e.g., a video interface, a display unit, or an input device) or in combination with other types of computer systems and program modules 1026.

The memory 1002 includes one or more computer-readable storage media capable of storing data and/or computer-executable instructions. Memory 1002 may store the computer-executable instructions that, when executed by processor 1005, provide the GCT system 116 according to an embodiment. In various embodiments, the memory 1002 is implemented in various ways. For example, the memory 1002 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EE-PROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 1005 includes one or more processing units, which may include tangible integrated circuits that selectively execute computer-executable instructions. In various embodiments, the processing units in the processing system 1005 are implemented in various ways. For example, the processing units in the processing system 1005 can be implemented as one or more processing cores. In this example, the processing system 1005 can comprise one or more microprocessors. In another example, the processing system 1005 can comprise one or more separate microprocessors. In yet another example embodiment, the processing system 1005 can comprise Application-Specific Integrated Circuits (ASICs) that provide specific functionality. In yet another example, the processing system 1005 provides specific functionality by using an ASIC and by executing computer-executable instructions.

The computing device 1000 may be enabled to send data to and receive data from a communication network via a network interface card 1006. In different embodiments, the network interface card 1006 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 1008 includes one or more computer-readable storage media, and may store data and computer-executable instructions not directly accessible by the processing system 1005. That is, the processing system 1005 performs an I/O operation to retrieve data and/or computer-executable instructions from the secondary storage device 1008. In various embodiments, the secondary storage device 1008 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 1010 enables the computing device 1000 to receive input from a user. Example types of input devices include, but are not limited to, keyboards, mice, trackballs, stylus input devices, key pads, microphones, joysticks, touch-sensitive display screens, and other types of devices that provide user input to the computing device 1000.

The video interface 1012 outputs video information to the display unit 1015. In different embodiments, the video interface 1012 is implemented in different ways. For example, the video interface 1012 is a video expansion card. In another example, the video interface 1012 is integrated into a motherboard of the computing device 1000. In various embodiments, the display unit 1015 can be an LCD display panel, a touch-sensitive display panel, an LED screen, a projector, a cathode-ray tube display, or another type of display unit. In various embodiments, the video interface 1012 communicates with the display unit 1015 in various ways. For example, the video interface 1012 can communicate with the display unit 1015 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 1016 facilitates communication among the hardware components of the computing device 1000. In different embodiments, the communications medium 1016 facilitates communication among different components of the computing device 1000. For instance, in the example of FIG. 10, the communications medium 1016 facilitates communication among the memory 1002, the processing system 1005, the network interface card 1006, the secondary storage device 1008, the input device 1010, and the video interface 1012. In different embodiments, the communications medium 1016 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1002 stores various types of data and/or software instructions. For instance, in the example of FIG. 10, the memory 1002 stores a Basic Input/Output System (BIOS) 1018, and an operating system 1020. The BIOS 1018 includes a set of software instructions that, when executed by the processing system 1005, cause the computing device 1000 to boot up. The operating system 1020 includes a set of software instructions that, when executed by the processing system 1005, cause the computing device 1000 to provide an operating system that coordinates the activities and sharing of resources of the computing device 1000. The memory 1002 also stores one or more application programs or program code 1022 that, when executed by the processing system 1005, cause the computing device 1000 to provide applications to users. The memory 1002 also stores one or more utility programs 1025 that, when executed by the processing system 1005, cause the computing device 1000 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPOE), etc. including any combination thereof.

FIGS. 11A-11B illustrate a suitable mobile computing device 1100 or environment, for example, a mobile computing device or smart phone, a tablet personal computer, a laptop computer, or other user device, with which aspects can be practiced. The mobile computing device 1100 is illustrative of any suitable device operative to send, receive and process wireless communications. A display screen 1105 is operative for displaying a variety of information such as information about incoming and outgoing communications, as well as, a variety of data and displayable objects, for example, text, alphanumeric data, photographs, and the like.

Data input to the mobile computing device 1100 can be performed via a variety of suitable means, such as, touch screen input via the display screen 1105, keyboard or keypad input via a data entry area 1110, key input via one or more selectable buttons or controls 1115, voice input via a microphone 1118 disposed on the mobile computing device 1100, biometric input via a biometric sensor 1120 disposed on the mobile computing device 1100, photographic input via a camera 1125 functionality associated with the mobile computing device 1100, or any other suitable input means. Data can be output via the mobile computing device 1100 via any suitable output means, including but not limited to, display on the Referring now to FIG. 11B, operational unit 1135 is illustrative of internal operating functionality of the mobile computing device 1100. display screen 1105, audible output via an associated speaker 1130 or connected earphone system, vibration module for providing tactile output, and the like. A processor 1140 is illustrative of a computer processor for processing incoming and outgoing data and communications and controlling operation of the device and associated software applications via a mobile computing device operating system. Memory 1145 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 1100 can contain an accelerometer 1155 for detecting acceleration, and can be used to sense orientation, vibration, and/or shock. Mobile computing device 1100 can contain a global positioning system (GPS) system (e.g., GPS send/receive functionality) 1160. A GPS system 1160 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 1150 include all required functionality, including onboard antennae, for allowing the mobile computing device 1100 to communicate with other communication devices and systems via a wireless network. Radio functions 1150 can be utilized to communicate with a wireless or WIFI-based positioning system to determine a device location. Other sensors 1165 can also be utilized to perform a plurality of additional functions. These sensors include gyroscopic sensors, ambient light sensors, proximity sensors, magnetometers, barometers, thermometers, air humidity sensors, radiation sensors, laser sensors, etc.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing geographically-converged telemetry data, the system comprising:
    a memory storage; and
    a processor coupled to the memory storage, wherein the processor is configured to:
        receive telemetry data from a plurality of telemetry data sources, wherein the plurality of telemetry data sources include a vehicle;
        determine geolocations associated with the telemetry data;
        associate geolocation metadata with the corresponding telemetry data based on the determined geolocations;
        identify telemetry data relevant to the vehicle based at least in part on the geolocation metadata;
        utilize different processing nodes to process the telemetry data so that the processing of the telemetry data follows the vehicle as it moves between processing nodes, wherein the processor being configured to utilize different processing nodes to process the telemetry data so that the processing of the telemetry data follows the vehicle as it moves between processing nodes comprises:
            determine an anticipated location of the vehicle based on navigation data, and
            transmit the converged telemetry data to another processing node in the edge network proximate to the anticipated location for minimizing latency;
        generate a feed of converged telemetry data relevant to the vehicle based on the processing of the telemetry data; and
        transmit the feed of converged telemetry data to the vehicle for enabling the vehicle to make a decision based at least in part on the relevant telemetry data.

2. The system of claim 1, wherein to determine the anticipated location of the vehicle, the system is further configured to:
    receive navigation data from the vehicle; and
    determine the anticipated location based on the received navigation data; or
    infer the anticipated location based on historic data associated with the vehicle.

3. The system of claim 1, wherein to identify telemetry data relevant to the vehicle, the system is further configured to determine telemetry data that are locally-relevant to the vehicle based at least in part on the anticipated location of the vehicle.

4. The system of claim 1, wherein the decision is associated with activating an automated functionality of the vehicle.

5. The system of claim 4, wherein to receive telemetry data from the plurality of telemetry sources, the system is further configured to:
    receive sensor data from the vehicle and from other vehicles; and
    generate the feed of converged telemetry data relevant to the vehicle to include information about a state of the vehicle and the other vehicles' surroundings, the state including at least one of:
        road conditions;
        weather conditions;
        navigation data; and
        a detection of:
            vehicles;
            pedestrians;
            objects; and
            road hazards.

6. The system of claim 1, wherein:
    the plurality of telemetry data sources further include at least one traffic control system; and
    the system is further configured to:
        identify telemetry data relevant to the traffic control system based at least in part on the geolocation metadata;
        generate a feed of converged telemetry data relevant to the traffic control system; and
        transmit the feed of converged telemetry data to the traffic control system for enabling the traffic control system to make a traffic control decision based at least in part on the relevant telemetry data.

7. The system of claim 6, wherein the traffic control decision is associated with at least one of:
    controlling a traffic signal light;
    controlling a pedestrian crossing signal; and
    altering swing lane direction.

8. The system of claim 6, further configured to:
    analyze the telemetry data to determine the traffic control decision, wherein the traffic control decision provides at least one of:
        optimized vehicular traffic flow;
        optimized pedestrian traffic flow;
        reduced energy consumption; and
        avoidance of a hazard; and
    transmit the traffic control decision to the traffic control system.

9. The system of claim 8, wherein to determine the traffic control decision for providing optimized vehicular traffic flow, the system is further configured to:

determine a traffic control decision that holistically optimizes vehicular traffic flow for a plurality of vehicles; or determine a traffic control decision that optimizes vehicular traffic flow for a single vehicle based on a service subscribed to by the single vehicle.

10. The system of claim 1, further configured to:

for each instance of received telemetry data, determine a network node used by the telemetry source to transmit the telemetry data to the system;

access a network topology database to determine a geolocation of the network node; and identify the geolocation of the network node as the geolocation associated with the telemetry data.

11. The system of claim 1, further configured to:

for each instance of received telemetry data, determine a plurality of network nodes that the telemetry source is in communication with;

determine the telemetry source's signal strength with respect to each of the plurality of network nodes;

access a network topology database to determine a geolocation of each of the plurality of network nodes; and determine, based on the signal strengths and geolocations of the plurality of nodes, a geolocation of the telemetry source.

12. The system of claim 1, wherein to transmit the feed of converged telemetry data to the vehicle, the system is further configured to:

anonymize the converged telemetry data;

publish the converged telemetry data to a data queue subscribed to by the vehicle;

receive an indication of a request for data published to the data queue; and transmit the converged telemetry data published to the data queue to the vehicle.

13. The system of claim 12, further configured to receive an indication of a subscription of the vehicle to the data queue, wherein the subscription defines data relevant to the vehicle based on one or more automated functions performed by the vehicle.

14. A method of providing edge-converged telemetry data, comprising:

receiving telemetry data from a plurality of telemetry data sources, wherein the plurality of telemetry data sources include at least one vehicle;

determining geolocations associated with the telemetry data;

associating geolocation metadata with the corresponding telemetry data based on the determined geolocations;

identifying telemetry data relevant to the at least one vehicle based at least in part on the geolocation metadata;

utilizing different processing nodes to process the telemetry data so that the processing of the telemetry data follows the vehicle as it moves between processing nodes, wherein utilizing different processing nodes to process the telemetry data so that the processing of the telemetry data follows the vehicle as it moves between processing nodes comprises:

determining an anticipated location of the vehicle based on navigation data, and transmitting the converged telemetry data to another processing node in the edge network proximate to the anticipated location for minimizing latency;

generating a feed of converged telemetry data relevant to the at least one vehicle based on the processing of the telemetry data; and transmitting the feed of converged telemetry data to the at least one vehicle for enabling the vehicle to make a decision based at least in part on the relevant telemetry data.

15. The method of claim 14, further comprising:

receiving telemetry data from at least one traffic control system;

identifying telemetry data relevant to the at least one traffic control system based at least in part on the geolocation metadata;

analyzing the telemetry data to determine a traffic control decision, wherein the traffic control decision provides at least one of:

optimized vehicular traffic flow;

optimized pedestrian traffic flow;

reduced energy consumption; and avoidance of a hazard; and generating a feed of converged telemetry data relevant to the traffic control system, the feed including the traffic control decision; and transmitting the feed of converged telemetry data to the traffic control system for enabling the traffic control system to act on the traffic control decision, wherein acting on the traffic control decision comprises at least one of:

controlling a traffic signal light;

controlling a pedestrian crossing signal; and altering swing lane direction.

16. The method of claim 15, further comprising:

receiving available parking space information associated with a second parking facility; and providing the available parking space information associated with the second parking facility to the at least one vehicle.

17. The method of claim 14, further comprising:

receiving available parking space information from a parking facility;

receiving navigation data from the at least one vehicle indicating an intended destination of the parking facility; and receiving navigation data from another vehicle indicating the parking facility as the intended destination of the other vehicle;

analyzing the received telemetry data for determining estimated arrival times of the at least one vehicle and the other vehicle;

determining an unavailability of a parking space at the parking facility for the at least one vehicle based on the estimated arrival times; and providing the determination to the at least one vehicle.

18. A computer readable storage device that includes executable instructions which, when executed by a processor perform a method comprising:

receiving telemetry data from a plurality of telemetry data sources, wherein the plurality of telemetry data sources include a vehicle;

determining geolocations associated with the telemetry data;

associating geolocation metadata with the corresponding telemetry data based on the determined geolocations;

identifying telemetry data relevant to the vehicle based at least in part on the geolocation metadata;

utilizing different processing nodes to process the telemetry data so that the processing of the telemetry data follows the vehicle as it moves between processing nodes, wherein utilizing different processing nodes to process the telemetry data so that the processing of the telemetry data follows the vehicle as it moves between processing nodes comprises:
    determining an anticipated location of the vehicle based on navigation data, and
    transmitting the converged telemetry data to another processing node in the edge network proximate to the anticipated location for minimizing latency;
generating a feed of converged telemetry data relevant to the vehicle based on the processing of the telemetry data; and
transmitting the feed of converged telemetry data to the vehicle for enabling the vehicle to make a decision based at least in part on the relevant telemetry data.

19. The computer readable storage device of claim 18, further comprising receiving an indication of a subscription of the vehicle to the data queue, wherein the subscription defines data relevant to the vehicle based on one or more automated functions performed by the vehicle.

20. The computer readable storage device of claim 18, further comprising determining telemetry data that are locally-relevant to the vehicle based at least in part on the anticipated location of the vehicle.

\* \* \* \* \*